US007010167B1

(12) United States Patent
Ordowski et al.

(10) Patent No.: US 7,010,167 B1
(45) Date of Patent: Mar. 7, 2006

(54) METHOD OF GEOMETRIC LINEAR DISCRIMINANT ANALYSIS PATTERN RECOGNITION

(75) Inventors: Mark Lawrence Ordowski, Ellicott City, MD (US); Gerard G. L. Meyer, Baltimore, MD (US)

(73) Assignee: The United States of America as represented by the National Security Agency, Washington, DC (US)

( * ) Notice: Subject to any disclaimer, the term of this patent is extended or adjusted under 35 U.S.C. 154(b) by 875 days.

(21) Appl. No.: 10/136,054

(22) Filed: Apr. 30, 2002

(51) Int. Cl.
*G06K 9/62* (2006.01)
(52) U.S. Cl. ...................... 382/225; 382/165; 382/190; 382/224; 382/276; 345/644; 375/240.16
(58) Field of Classification Search ...................... None
See application file for complete search history.

(56) References Cited

U.S. PATENT DOCUMENTS

| | | | |
|---|---|---|---|
| 4,837,828 A | | 6/1989 | Watari |
| 5,239,594 A | * | 8/1993 | Yoda ........................... 382/158 |
| 5,479,523 A | | 12/1995 | Gaborski et al. |
| 5,491,758 A | | 2/1996 | Bellegarda et al. |
| 5,544,261 A | | 8/1996 | Bellegarda et al. |
| 5,712,956 A | | 1/1998 | Yamada et al. |
| 5,734,796 A | | 3/1998 | Pao |
| 6,026,399 A | | 2/2000 | Kohavi et al. |
| 6,134,344 A | | 10/2000 | Burges |
| 6,137,909 A | | 10/2000 | Greineder et al. |
| 6,178,261 B1 | | 1/2001 | Williams et al. |

OTHER PUBLICATIONS

Mark Ordowski and Gerard G. L. Meyer, Geometric Linear Discriminant Analysis, May 2001, IEEE.*

Cannon, A., L. J. Cowen, et al. (1998). "Approximate Distance Classification." *Computing Science and Statistics* 30(1): 544-549.

Kimura, F., T. Wakabayashi, et al. (1996). *On Feature Extraction for Limited Class Problem.* Proceedings of the 13th International on Pattern Recognition.

Hastie, T. and R. Tibshirani (1996). "Discriminant adaptive nearest neighbor classification." *IEEE Transactions on Pattern Analysis and Machine Intelligence* 18(6): 607-616.

Schulerud, H. (2000). *Bias of Error Rates in Linear Discriminant Analysis Caused by Feature Selection and Sample Size.* Proceedings of the 15th International Conference on Pattern Recognition.

Buturovic, L. J. (1994). "Toward Bayes-optimal linear dimension reduction." *IEEE Transactions on Pattern Analysis and Machine Intelligence* 16(4): 420-424.

Diaconis, P. and D. Freedman (1984). "Asymptotics of Graphical Projection Pursuit." *Annals of Statistics* 12(3): 793-815.

Devroye, L. (1988). "Automatic Pattern Recognition: A Study of the Probability of Error." *IEEE Transactions on Pattern Analysis and Machine Intelligence* 10(4): 530-543.

Priebe, C. E. and L. J. Cowen (1998). "Approximate Distance Clustering." *Computing Science and Statistics* 29 (1): 337-346.

(Continued)

*Primary Examiner*—Mark Zimmerman
*Assistant Examiner*—Alex Liew
(74) *Attorney, Agent, or Firm*—Stephen M. Bloor

(57) ABSTRACT

Feature attributes are extracted from an observation space to create feature vectors for each class to be identified. A linear transformation matrix is used to reduce the dimension of the feature vectors. A numerical optimization algorithm maximizes a geometric criterion function in order to calculate the linear transformation matrix, where it exploits the geometry of the class contours of constant density. Next, a classifier based on the feature vectors in a lower dimension is generated and a class is determined for the data represented.

42 Claims, 5 Drawing Sheets

OTHER PUBLICATIONS

Antos, A., L. Devroye, et al. (1999). "Lower Bounds for Bayes Error Estimation." *IEEE Transactions on Pattern Analysis and Machine Intelligence* 21(7): 643-645.

Lotlikar, R. and R. Kothari (2000). "Fractional-Step dimensionality reduction." *IEEE Transactions on Pattern Analysis and Machine Intelligence* 22(6): 623-627.

Kawatani, T., H. Shimizu, et al. (1996). *Handwritten Numeral Recognition with the Improved LDA Method.* 13th International Conference on Pattern Recognition, IEEE.

Decell, H. P. and J. A. Quirein (1972). *An Iterative Approach to the Feature Selection Problem.* Purdue University Conference on Machine Processing of Remotely Sensed Data.

Cappelli, R. and D. Maltoni (2001). "Multispace KL for pattern representation and classification." *IEEE Transactions on Pattern Analysis and Machine Intelligence* 23(9): 977-996.

Aladjem, M. (1997). "Linear Discriminant Analysis for Two Classes via Removal of Classification Structure." *IEEE Transactions on Pattern Analysis and Machine Intelligence* 19(2): 187-192.

Hiraoka, K., K. Hidai, et al. (2000). *Successive Learning of Linear Discriminant Analysis: Sanger-Type Algorithm.* Proceedings of the 15th International Conference on Pattern Recognition.

Fisher, R. A. (1936). "The Use of Multiple Measurements in Taxonomic Problems." *Annals of Eugenics* 7(2): 179-188.

Saon, G., M. Padmanabhan, et al. (2000). *Maximum Likelihood Discriminant Feature Spaces.* IEEE International Conference on Acoustics, Speech and Signal Processing, Istanbul, Turkey.

Duchene, J. and S. Leclercq (1988). "An Optimal Transformation for Discriminant and Principal Component Analysis." *IEEE Transactions on Pattern Analysis and Machine Intelligence* 10(6): 978-983.

Huber, P. J. (1985). "Projection Pursuit." *Annals of Statistics* 13(2): 435-475.

Duin, R. P. W., E. Pekalska, et al. (1999). "Relational discriminant analysis." *Pattern Recognition Letters* 20(11-13): 1175-1181.

Kamppari, S. O. and T. J. Hazen (2000). *Word and Phone Level Acoustic Confidence Scoring.* International Conference Acoustic, Speech and Signal Processing, IEEE.

Saon, G. and M. Padmanabhan (2001). *Minimum Bayes Error Feature Selection for Continuous Speech Recognition,* MIT Press.

Ünsalan, C. and A. Erçil (2000). *Shapes of Features and a Modified Measure for Linear Discriminant Analysis.* Proceedings of the 15th International Conference on Pattern Recognition.

Kulkarni, S. R., G. Lugosi, et al. (1998). "Learning Pattern Classification—A Survey." *IEEE Transactions on Information Theory* 44(6): 2178-2206.

Rao, C. R. (1948). "The Utilization of Multiple Measurements in Problems of Biological Classification." *Journal of the Royal Statistical Society. Series B (Methodological)* 10(2): 159-203.

Young, S. (1996). "A Review of Large-Vocabulary Continuous-Speech Recognition." *IEEE Signal Processing Magazine* 13(5): 45-57.

Gnanadesikan, R., R. K. Blashfield, et al., (1989). "Discriminant Analysis and Clustering: Panel on Discriminant Analysis, Classification, and Clustering." *Statistical Science* 4(1): 34-69.

* cited by examiner

METHOD OF GEOMETRIC LINEAR DISCRIMINANT ANALYSIS PATTERN RECOGNITION

BACKGROUND OF THE INVENTION

1. Field of the Invention

This invention relates generally to pattern recognition and particularly to feature selection problem in statistical pattern recognition, more specifically, the invention provides a method for ranking features in order of importance and for selecting the features that are important to the classification of objects and recognition of patterns.

2. Description of the Related Art

The human brain is a supreme pattern recognition system. We rely on its ability to successfully process and recognize patterns to accomplish a variety of tasks. When walking down a street, we avoid tripping over curbs or bumping into walls. When driving, we stay in a lane and stop at red lights. We recognize words when reading newspapers or sounds when listening to the radio. We can fumble in our pocket to find a quarter for the vending machine. Although the exact output needed from our brain to accomplish any of these tasks is certainly not restrained by definite limits, identifying the object's proper class is of primary importance.

Today, simple pattern recognition systems are readily found, such as bar code scanners, magnetic strip scanners, or bill exchangers found in vending machines. However, the recent growth in research and development of automated pattern recognition systems and more advanced compute facilities has allowed more complex problems such as character recognition or automated speech recognition to be addressed. As the problems become more complex, the practical applicability of existing theories, as explained in the following paragraph, is exposed and the need to create techniques to deal with these practical applications and their associated pitfalls arises.

An important class of methods used to determine the identity of objects is referred to as statistical pattern recognition (see PATTERN CLASSIFICATION, Duda and Hart et al. (1973); INTRODUCTION TO STATISTICAL PATTERN RECOGNITION, Fukunaga (1990); and A PROBABILISTIC THEORY OF PATTERN RECOGNITION, Devroye, Györfi et al. (1996)), which is well known in the art. These methods make use of a probabilistic model to define the identity of each class. For example, a decision processor determines the object's identity by comparing an observation of that object against a set of class probabilistic models, hence the name statistical pattern recognition. The success of statistical pattern recognition depends on: 1) creating a consistent discrimination rule for the decision processor; 2) choosing the best probabilistic model and being able to accurately estimate the parameters of that model; and 3) finding an optimal set of feature attributes that makes the class identities distinguishable from each other.

The pitfalls associated with the object's observation or set of feature attributes affects many aspects of statistical pattern recognition theory when it is practically applied on real-world problems, like automatic speech recognition (see "A Review of Large-Vocabulary Continuous-Speech Recognition," IEEE SIGNAL PROCESSING MAGAZINE, Vol. 13, No. 5, Young (1996); and STATISTICAL METHODS FOR SPEECH RECOGNITION, Jelinek (1997)). A feature based statistical pattern recognition system uses a set of feature attributes, known as the feature set, to describe the properties on an object. These feature attributes, for example, can be a collection of measurements taken from different sensors. For many applications, the feature attributes that allow the statistical models for each of the classes to be mutually distinguishable are unknown.

An improper feature set will create difficulties for the decision processor and statistical models. The size of the feature set—the number of feature attributes that describe the properties of an object—is a chief concern. If the feature set is too small, then there will be an inadequate amount of discriminative information to separate the classes. The lack of discriminative information will result in a decision processor that performs poorly. On the other hand, if the feature set is too large the ratio between the number of observed objects and the number of parameters in the statistical models to be estimated become disproportional. This is well known in the art as the "curse of dimensionality." An unrestrained expansion on the size of the feature set will also result in a decision processor that performs poorly.

A principal reason that the "curse of dimensionality" exists is that the number of observations available to estimate the parameters of the statistical models is finite or very expensive to obtain in sufficient quantities for many practical pattern recognition problems. As the number of feature attributes, also known as the dimension of the observation space, increases, the available data becomes sparse in the observation space. This sparsity of the data makes it more difficult to obtain accurate estimates of the model parameters that are needed for good robust decision processors. For example, in a speech recognition problem the basic sound units may be represented as 50 different phonemes. Measuring 20 examples of each phoneme, for a total of 1,000 observations, using 36 different feature attributes, where d=36 is the dimension of the observation space, let's model each phoneme with a normal distribution, which has 0.5 ($d^2$+3d) model parameters. The number of parameters that must be estimated with 36,000 feature attributes is 35,100. It follows that the model parameters estimated from the observed data might not be very accurate and the corresponding decision processor may have poor performance.

Another pitfall associated with a large feature set size is related to the increased complexity of the pattern recognition system. From an economic perspective, decision processors that run fast and require little computer memory are usually preferable. The dimension of the observation space is a factor in establishing a lower bound on the number of floating point operations needed for the decision processor to assign a class identity to an observation. The dimension of the observation space often controls the number of parameters for statistical models, which directly affects the amount of computer memory needed to store that model.

The selection of a proper feature set affects all types of decision processors, whether neural network or classical approaches. The selection of a proper feature set can be broken down into a variable selection and a feature selection problem. Variable selection is a more abstract problem of selecting input variables for the observation space that are the most predictive of an outcome. Feature selection is the problem of finding the optimal subset of features derived from the observation space. The difference between variable selection and feature selection problems is very small, and therefore, confusion often arises because these terms are used interchangeably.

The variable selection problem is simply the identification of feature attributes that provide discriminatory information that allow the class identities to become mutually distinguishable. However, as stated, arbitrarily creating a high dimensional observation space creates problems for the decision processor and statistical models, so the variable selection problem establishes the observation space that feeds the feature selection problem, where a prime objective of feature selection problem is to reduce the dimension of the observation space so that the optimal feature attributes are found. This enables the pattern recognition system designer to manage the complexity of the decision processor, as well as, control the robustness and accuracy of the pattern recognition system.

The feature selection problem in a statistical pattern recognition system can be illustrated with the following example. Without loss of generality, consider a problem where the objective is to determine an observation's identity as coming from one of two classes. The observation is a vector x is in a Euclidean space $E^d$, which is a collection of d-tuples $(x_1, x_2, \ldots, x_d)$ of real numbers $x_i$ for $i=1, 2, \ldots, d$ with a metric $$\sqrt{\sum_{i=1}^{d} x_i^2}.$$

A random variable X is defined to provide a connection between any element of $E^d$ and the value assigned to an observation vector x, also known as a feature vector. Following the framework given by Devroye (see A PROBABILISTIC THEORY OF PATTERN RECOGNITION, Devroye, Györfi, et al. (1996)), the decision rule, also known as a classifier, is a function that maps the observation vector $x \in E^d$ to a class label l from the set $\{\omega_1, \omega_2\}$. That is, the classifier is defined as $$g(x): E^d \to \{\omega_1, \omega_2\}. \quad (1)$$

When each observation has an identity, then the identity of that observation can be joined together to create observation-label pairs (x, l), where $x \in E^d$ and $l \in \{\omega_1, \omega_2\}$. A pair of random variables (X, L) is defined to provide a connection between any element of $E^d \times \{\omega_1, \omega_2\}$ and the value assigned to an observation-label pair (x, l). At a fundamental level, this random value pair (X, L) describes the pattern recognition problem. By defining the distribution for that random valued pair (X, L), a pattern recognition problem takes on a probabilistic framework, i.e. statistical pattern recognition.

Equation (1) does not provide insight as to the proper choice for the classifier g(•). A reasonable criterion to adopt for choosing g(•) is one that minimizes the average probability of making an error when choosing the class identity of an observation.

Since a classification error occurs when $g(X) \neq L$, the average error probability for the classifier g(•) given by equation (1) is defined as $$\text{err}(g) = Pr\{g(X) \neq L\} = 1 - \sum_{i=1}^{2} Pr\{L = \omega_i, g(X) = \omega_i | X = x\}. \quad (2)$$

The best possible classifier, also known as the Bayes classifier (see PATTERN CLASSIFICATION AND SCENE ANALYSIS, Duda and Hart (1973); and INTRODUCTION TO STATISTICAL PATTERN RECOGNITION, Fukunaga (1990)), is a mapping function g*(•) that minimizes the average error probability, that is $$g^*(X) = \underset{g: E^d \to \{\omega_1, \omega_2\}}{\text{argmin}} Pr\{g(X) \neq L\}. \quad (3)$$

The classifier defined from equation (3) operates in a d-dimensional space, because the observation vector x has d feature attributes. A generic approach to feature selection is to find p features, where p is an integer less than d, that would allow the optimal classifier in p dimensions to be created. The dimension of the observation space, for example, can be reduced by an arbitrary measurable function defined as $$T(x): E^d \to E^p. \quad (4)$$

The function T(•) reduces a d-dimensional observation vector x to a p-dimensional vector y. When the transformation is applied to the pattern recognition problem, the problem changes from a distribution on (X, L) to a distribution on (Y=T(X), L). A classifier that employs an arbitrary measurable function to reduce the dimension of the observation space is defined as $$g(y): \left(E^d \xrightarrow[y=T(x)]{} E^p\right) \to \{\omega_1, \omega_2\}. \quad (5)$$

The Bayes classifier, which operates in dimension p and minimizes the average error probability, is defined as $$g^* = \underset{g: \left(E^d \xrightarrow{T} E^p\right) \to \{\omega_1, \omega_2\}}{\text{argmin}} Pr\{g(Y) \neq L\}. \quad (6)$$

The Bayes classifiers, defined by equations (3) and (6), are not fundamentally different. The transformation T(•) and the integer p are explicitly shown as undetermined variables in this minimization problem. The two formulations show that feature selection problem is not a separate problem from finding the optimal decision rule. However, the difference between the two formulations does suggest a way to break the problem into more manageable pieces. It may be easier to work the problem if the search for the "best" decision rule is separate from the search for the "best" transformation function. This can be accomplished, for example, if a functional form for the decision rule g(•) is assumed before searching for the "best" linear transformation.

This simplification may be far from optimal for any distribution (X, L) and the given classifier g(X). However, the optimal transformation for each p, where $1 \leq p < d$, given a classifier g(•) would be defined as $$\hat{T}_p(X) = \underset{T: E^d \to E^p}{\text{argmin}} Pr\{g(T(X)) \neq L\}. \quad (7)$$

In so far as the functional form of g(•) is appropriate for the distribution of (X, L) and (Y=T(X), L), equation (7) would be a reasonable simplification.

To illustrate an example of a transformation function T(•), consider reducing a d-dimensional observation vector x to a p-dimensional vector y by means of a linear transformation, that is, $y = \Psi_p x$ where $\Psi_p$ is a p×d matrix. Desirable properties for this matrix would be p linearly independent row vectors, that is, rank($\Psi_p$)=p, and the row vectors of $\Psi_p$ have an L2-norm of one.

Without loss of generality, consider the extreme case of finding the "best" linear transformation when p=1, that is, find a vector $z^T=\Psi_{p=1}$ to transforms a d-dimensional observation x into a scalar y for a pattern recognition problem with two equally likely classes. Assume the class identities are modeled by a normal distribution, that is, the class conditional density for the $i^{th}$ class is defined as $$p_i(x)=N(x;\mu_i,\Sigma_i) \quad (8)$$

where $\mu_i$ is the class mean vector and $\Sigma_i$ is the class covariance matrix for the multi-variate normal distribution. The optimal decision rule that determines the class identity given the observation vector x in d-dimensions is defined as if $p_1(x)>p_2(x)$, then $x$ belongs to class 1 otherwise class 2. (9)

Under this rule, the number of incorrectly identified observations will be minimized.

The decision rule can be rewritten by using discriminant functions $g_i(x)$ that are a function of the class conditional density function (8). The discriminant function for each class is defined as $$g_i(x)=-\tfrac{1}{2}x^T\Sigma_i^{-1}x+\mu_i^T\Sigma_i^{-1}x-\tfrac{1}{2}\mu_i^T\Sigma_i^{-1}\mu_i-\tfrac{1}{2}\log_e|\Sigma_i|, \; i=1,2. \quad (10)$$

The optimal decision rule using these discriminant functions, also known as Bayes classifier in dimension d, is defined as if $g(x)=g_1(x)-g_2(x)>0$, then $x$ belongs to class 1 otherwise class 2. (11)

Given any vector z to transform the observations x into observations y by means of the linear transformation $y=z^Tx$, the class conditional densities for observations y are normal and defined as $$p_i(y)=N(y;\mu_i=z^T\mu_i,\sigma_i^2=z^T\Sigma_i z) \quad (12)$$

where the scalars $\mu_i$, $\sigma_i^2$ are the mean and variance of the normal distribution.

Given the vector z, the classifier for observation $y=z^Tx$ is defined in terms of its discriminant functions $g_i(\cdot)$ as if $g(y)=g_1(y)-g_2(y)>0$, then $y$ belongs to class 1 otherwise class 2. (13)

The discriminant functions $g_i(\cdot)$ for equation (13) are defined as $$g_i(y) = \frac{(y-\mu_i)^2}{2\sigma_i^2} - \log_e \sigma_i, \quad (14)$$
$$i=1,2$$

where $y=z^Tx$, $\mu_i=z^T\mu_i$, $\sigma_i^2=z^T\Sigma_i z$, for i=1, 2.

However, the classifier defined by (13) is not the Bayes classifier unless z is the "best" linear transformation vector, which can be found by solving the following given the classifier $g(\cdot)$ defined by equation (13).

A universal solution for the problem defined by equation (15), $$z^* = \underset{z \in E^d, \|z\|=1}{\operatorname{argmin}} \; Pr\{g(z^TX) \neq L\}, \quad (15)$$

is not obvious and Antos (see "Lower Bounds for Bayes Error Estimation," IEEE TRANSACTIONS ON PATTERN ANALYSIS AND MACHINE INTELLIGENCE, Antos, Devroye et al. (1999)) provides a proof that no one can "claim to have a universally superior feature selection" method. That is to say, claiming to have a feature selection method that finds the optimal set of features for any pattern recognition problem defined by any distribution type (X, L) is not possible.

The most obvious approach to solve the problem defined by equation (15) would consist of defining the error probability function for the classifier and then minimizing that function, that is, generate an analytic form for $Pr\{g(z^TX) \neq L\}$. However, this approach of finding an analytic form for error probability function has it flaws. In general, the complexity and form for the error probability function depends on the distribution for (X, L). Even when the distributions are normal, one is hard pressed to find an analytic solution for equation (15).

An alternative approach is to define a criterion function that, under optimal conditions, has a minimum or maximum that is correlated with the minimum of the error probability function. The selection and development of the appropriate criterion function that is correlated with the error probability function is not obvious. Several methods have been proposed and developed that address the feature selection problem. Many of these methods, such as Fisher's Linear Discrimant Analysis (LDA), Heteroscedastic LDA, Average Symmetric Divergence LDA, and Bhattacharyya LDA, positively advance the science and work well when assumptions used to develop the method are met by the pattern recognition problem. These methods have some limitations, such as a requirement, that the class covariance matrices be the same for all classes or that the class distributions be normal in order to have an analytic form for a key integral, or require matrix inversion causing potential problems when those matrices are ill conditioned. A description of the four methods previously mentioned follows.

Fisher ("The Use of Multiple Measurements in Taxonomic Problems," ANNALS OF EUGENICS, Fisher (1936)) first introduced a method, which is known as Fisher's Linear Discriminant Analysis, that uses a linear function to discriminant between two species of flowers, *Iris setosa* and *Iris versicolor*. He proposed that the best linear function to separate the classes is the ratio between the squared difference of the class means and the variance within the classes. In 1948, Rao ("The Utilization of Multiple Measurements in Problems of Biological Classification," JOURNAL OF THE ROYAL STATISTICAL SOCIETY, SERIES B (METHODOLOGICAL), Vol. 10, No. 2, Rao (1948)) extended this approach for classification problems with multiple classes.

Fisher's linear discriminant is found by maximizing one of the criterion functions in equation (16), $$f(\Psi) = \frac{|\Psi S_B \Psi^T|}{|\Psi S_W \Psi^T|} \text{ or } f(\Psi) = \frac{|\Psi S_T \Psi^T|}{|\Psi S_W \Psi^T|}. \quad (16)$$

Equation (17), $$S_B = \frac{1}{N} \sum_{i=1}^{C} n_i (\mu_i - \mu)(\mu_i - \mu)^T \text{ with } \mu = \sum_{i=1}^{C} \mu_i, \quad (17)$$

$$S_W = \frac{1}{N} \sum_{i=1}^{C} n_i \Sigma_i$$

defines the matrix $S_B$, which is the between class scatter matrix, and the matrix $S_W$, which is the within class scatter matrix. $S_T$ is the total scatter matrix where $S_T = S_B + S_W$. If there is a limited amount of training, then the criterion function containing the matrix $S_T$ may provide a more accurate discriminant since more data went into its estimation.

The maximization of equation (16) is obtained by computing the eigenvectors corresponding to the largest eigenvalues of $S_W^{-1} S_B$ or $S_W^{-1} S_T$. There are at most rank($S_B$)-1 eigenvectors that have non-zero eigenvalues. The rank($S_B$) is at most C, the number of classes to discriminate. Therefore, there are at most C-1 linear independent eigenvectors for the transformation matrix $\Psi$ that can be used to reduce the dimension of the problem from $E^d$ to $E^{C-1}$. Thus, the p×d matrix $\Psi_p$ is limited to $p \leq C-1$.

It is known that Fisher's method for Linear Discriminant Analysis (LDA) does not achieve Bayes error probability under many conditions. One case is when the class distributions are normal with class covariance matrices that are not equal and not proportional. Kumar and Andreou ("Investigation of Silicon Auditory Models and Generalization of Linear Discriminant Analysis for Improved Speech Recognition," ELECTRICAL AND COMPUTER ENGINEERING, Johns Hopkins Univ., Kumar (1997)) proposed a maximum likelihood approach for pattern recognition problems where Fisher's LDA does not achieve Bayes error probability. This approach is known as Heteroscedastic Discriminant Analysis (HDA). Saon, et al. (MINIMUM BAYERS ERROR FEATURE SELECTION FOR CONTINUOUS SPEECH RECOGNITION, Saon, Padmanabhan et al. (2000)) proposed a method very similar in form to Kumar's approach. Neither of these approaches has a closed form solution. Therefore, a solution is obtained through a numerical optimization such as a gradient ascent procedure.

Saon's approach, known as Heteroscedastic LDA, is defined by a criterion function that is the product of the squared distance to the class covariance weighted by the a-priori class probability. The function is defined as $$H(\Psi_P) = \prod_{i=1}^{C} \left( \frac{|\Psi_P S_B \Psi_P^T|}{|\Psi_P \Sigma_i \Psi_P^T|} \right)^{p_{\omega_i}} = \frac{|\Psi_P S_B \Psi_P^T|}{\prod_{i=1}^{C} |\Psi_P \Sigma_i \Psi_P^T|^{p_{\omega_i}}} \quad (18)$$

where $S_B$ is defined by equation (17) and $p_{\omega_i}$ is the class a-priori probability. In order to make equation (18) applicable for a numerical optimization algorithm, like a gradient ascent algorithm, equation (18) is rewritten as equation (19).

The criterion function that Heteroscedastic LDA must solve using a numerical optimization algorithm is defined by $$\hat{\Psi}_p = \underset{\Psi \in \{E^p \times E^d\}, rank(\Psi) = p}{\operatorname{argmax}} \left\{ \log_e(|\Psi S_B \Psi^T|) - \sum_{i=1}^{C} p_{\omega_i} \log_e(|\Psi \Sigma_i \Psi^T|) \right\} \quad (19)$$

and its gradient is defined by $$\nabla H(\Psi_p) = 2(\Psi_p S_B \Psi_p^T)^{-1} \Psi_p S_B - 2 \sum_{i=1}^{C} p_{\omega_i} (\Psi \Sigma_i \Psi_p^T)^{-1} \Psi_p \Sigma_i. \quad (20)$$

Heteroscedastic LDA has the same limitations in some cases as Fisher's LDA, because it is derived from the same criterion function.

It is known that the divergence between two distributions for the class models is a reasonable measure of class separability or "degree of difficulty" to discriminant between two classes. Ultimately, if the divergence between two distributions could be modified to make it a metric, then it would be a very useful for classification. The best that can be done is to make the measure positive and symmetric. Kullback (INFORMATION THEORY AND STATISTICS, Kullback (1968)) defines the symmetric divergence between two classes with density functions $p_i(x)$ as $$D(i, j) = \int p_i(x) \log \frac{p_i(x)}{p_j(x)} dx - \int p_j(x) \log \frac{p_i(x)}{p_j(x)} dx. \quad (21)$$

The use of the divergence measure as a way to find the linear transformation matrix has a long history. Tou and Heydorn proposed the method for a two-class problem in 1967. Babu and Kalra extended the approach to handle multiple classes in 1972. Decell and Quirein provided a correct definition for the gradient of the divergence and provided some mathematical analysis for this technique. Saon and Padmanabhan applied this technique to a voice mail transcription task.

In order utilize a symmetric divergence measure as a method to find a linear transformation matrix, the following assumptions about the classification problem are made. First, by assuming normal class conditional densities, that is, $p_i(x) = N(x; \mu_i, \tau_i)$, a closed form solution for the integrals of equation (21) is established and defined as $$D(i, j) = \frac{1}{2} \operatorname{trace}\{\Sigma_i^{-1}[\Sigma_j + (\mu_i - \mu_j)(\mu_i - \mu_j)^T]\} + \frac{1}{2} \operatorname{trace}\{\Sigma_j^{-1}[\Sigma_i + (\mu_i - \mu_j)(\mu_i - \mu_j)^T]\} - d. \quad (22)$$

Second, by defining the average pair-wise symmetric divergence this method is extended to handle classification problems with more than two classes. The average pair-wise symmetric divergence is defined as $$\bar{D} = \frac{2}{C(C-1)} \sum_{1 \le i \le j \le C} D(i, j). \quad (23)$$

By assuming normal class distributions and creating a criterion function that is an average, the scope of problems that this approach may be optimal against has been limited.

Given a p×d matrix $\Psi_p$ and with the assumption of normal class conditional densities, $p_i(x)=N(x;\mu_i, \Sigma_i)$, the class conditional densities in the projected space are also normal, that is, $p_i(y=\Psi_p x)=N(y;\Psi_p \mu_i, \Psi_p \Sigma_i \Psi_p^T)$. The average pair-wise divergence of equation (23) in the projected space can be rewritten in terms of $\Psi_p$, such that $$\bar{D}(\Psi_p) = \frac{2}{C(C-1)} \text{trace} \left\{ \sum_{i=1}^{C} (\Psi_p \Sigma_i \Psi_p^T)^{-1} \Psi_p S_i \Psi_p^T \right\} - p \quad (24)$$

where $$S_i = \sum_{j \ne i} \Sigma_j + (\mu_i - \mu_j)(\mu_i - \mu_j)^T \cdot \bar{D}(\Psi_p)$$

is known as the projected average pair-wise divergence.

Since the symmetric divergence $D(i, j)$ is positive, then the average symmetric divergence $\bar{D}$ is positive. Using the data processing inequality (ELEMENTS OF INFORMATION THEORY, Cover and Thomas (1991)) and the fact that $\bar{D}$ is positive, then $\bar{D}(\Psi_p)$ is positive. Therefore, $\Psi_p$ can be found by maximizing $\bar{D}(\Psi_p)$, because the objective is to make the difference between $\bar{D}-\bar{D}(\Psi_p)$ as small as possible. This can be formulated as $$\hat{\Psi}_p = \underset{\Psi \in \{E^p \times E^d\}, rank(\Psi) = p}{\text{argmax}} \bar{D}(\Psi). \quad (25)$$

The problem above can be solved by using a numerical optimization algorithm, such as a gradient ascent. This type of algorithm requires the gradient of $\bar{D}(\Psi)$ and is defined as $$\nabla \bar{D}(\Psi) = \frac{2}{C(C-1)} \sum_{i=1}^{C} (\Psi \Sigma_i \Psi^T)^{-1} \left[ \Psi S_i - \Psi S_i \Psi^T (\Psi \Sigma_i \Psi^T)^{-1} \Psi \Sigma_i \right]. \quad (26)$$

When it is not possible to obtain a closed-form expression for the error probability, then it is reasonable to define an upper bound for that error. The Bhattacharyya bound, a special case of the Chernoff bound, does just that when the class conditional densities are assumed to have normal distributions. The use of the Bhattacharyya distance as a basis to find a linear transformation for pattern recognition problems with two classes is described by Fukunaga. Saon and Padmanabhan proposed a method to find a p×d matrix $\Psi_p$ based on the union of Bhattacharyya upper bounds. Their criterion function can handle pattern recognition problems with more than two classes.

The Bhattacharyya bound is a special case of the Chernoff bound. The Chernoff bound is an upper bound on Bayes error by making use of the geometric mean. The Bayes error for a two-class problem is $$p(\text{error}) = \int p(\text{error},x) dx = \int p(\text{error}|x) p(x) dx \quad (27)$$

where the error probability given x is the minimum of the class posterior probabilities under Bayes decision rule, that is, $p(\text{error}|x) = \min[p(\omega_i|x), p(\omega_j|x)]$. Since the probability distribution functions are positive, then by the geometric mean inequality, $\min[a, b] \le a^s b^{1-s}$ with $s \in [0,1]$, the Bayes error can be bounded above by $$p(\text{error}) \le p_{\omega_i}^s p_{\omega_j}^{1-s} \int p_i^s(x) p_j^{1-s}(x) dx \quad (28)$$

where $p_{\omega_i}$, $p_{\omega_j}$ are the class a-priori probability and $p_i(x)$, $p_j(x)$ are the class conditional densities.

The integral found in equation (28) has a closed form solution when the class conditional density functions are normal, that is, $p_i(x)=N(x;\mu_i, \Sigma_i)$. This is called the Chernoff bound and is defined as $$\epsilon_{\tau(i,j;s)} = p_{\omega_i}^s p_{\omega_j}^{1-s} e^{-\tau(i,j;s)} \quad (29)$$

where the Chernoff distance between two classes is defined as $$\tau(i, j; s) = \frac{s(1-s)}{2} (\mu_i - \mu_j)^T [s\Sigma_i + (1-s)\Sigma_j]^{-1} (\mu_i - \mu_j) + \quad (30)$$

$$\frac{1}{2} \ln \frac{|s\Sigma_i + (1-s)\Sigma_j|}{|\Sigma_i|^s |\Sigma_j|^{1-s}}.$$

The Bhattacharyya bound is a special case of the Chernoff bound with $\tau(i, j; s=\frac{1}{2})$. By selecting a value for s, the Bhattacharyya bound is less complicated, but this means that the optimum Chernoff bound, defined by a s in the interval [0,1], may not be used. The Bhattacharyya distance between two classes is defined as $$\rho(i, j) = \frac{1}{8} (\mu_i - \mu_j)^T \left[ \frac{\Sigma_i + \Sigma_j}{2} \right]^{-1} (\mu_i - \mu_j) + \frac{1}{2} \log_e \frac{\left| \frac{\Sigma_i + \Sigma_j}{2} \right|}{\sqrt{|\Sigma_i||\Sigma_j|}} \quad (31)$$

and the Bhattacharyya bound on the error probability is defined as $$\varepsilon_{\rho(i,j)} = \sqrt{p_{\omega_i} p_{\omega_j}} \, e^{-\rho(i,j)}. \quad (32)$$

The Bhattacharyya bound as given by equation (32) is an upper bound for the Bayes error between two-classes. In order make this bound applicable to pattern recognition problems with more than two classes, an upper bound of Bayes error for multiple classes is defined. Saon and Padmanabhan show that the following is an upper bound on Bayes error for pattern recognition problems with more than two classes.

Upon inspection of equation (33), $$P(\text{error}) \leq \sum_{1 \leq i \leq j \leq C} \sqrt{p_{\omega_i} p_{\omega_j}} \int \sqrt{p_i(x) p_j(x)}\, dx, \quad (33)$$

it can be seen that objects of the form of equation (32) are summed. By taking a union of Bhattacharyya bounds defined by (32), an upper bound for summation of (33) exists. Thus, the union of Bhattacharyya bounds is defined as $$P(\text{error}) \leq \sum_{1 \leq i \leq j \leq C} \sqrt{p_{\omega_i} p_{\omega_j}}\, e^{-\rho(i,j)}. \quad (34)$$

Equation (34) forms the basis for the criterion function that can be used to find a p×d matrix $\Psi_p$ that will be used to reduce the dimension of the observation space. Given a matrix $\Psi_p$ and with the assumption that the class conditional densities are normal, $p_i(x) = N(x; \mu_i, \Sigma_i)$, the class conditional densities in the projected space are also normal, that is, $p_i(y = \Psi_p x) = N(y; \Psi_p \mu_i, \Psi_p \Sigma_i \Psi_p^T)$. The Bhattacharyya distance in the projected space between two classes becomes $$\rho_{\Psi_p}(i,j) = \frac{1}{8}\text{trace}\{(\Psi_p W_{ij} \Psi_p^T)^{-1} \Psi_p S_{ij} \Psi_p^T\} + \frac{1}{2}\ln\frac{|\Psi_p W_{ij} \Psi_p^T|}{\sqrt{|\Psi_p \Sigma_i \Psi_p^T||\Psi_p \Sigma_j \Psi_p^T|}} \quad (35)$$

where $S_{ij} = (\mu_i - \mu_j)(\mu_i - \mu_j)^T$; $W_{ij} = \frac{1}{2}(\Sigma_i + \Sigma_j)$ for $1 \leq i < j \leq C$. The Bhattacharyya bound in the projected space is $$B(\Psi) = \sum_{1 \leq i \leq j \leq C} \sqrt{p_{\omega_i} p_{\omega_j}}\, e^{-\rho_\Psi(i,j)}. \quad (36)$$

Given that this is an upper bound on Bayes error probability, finding a matrix $\Psi_p$ that minimizes equation (36) is the problem that needs to be solved. Thus, $$\hat{\Psi}_p = \operatorname*{argmin}_{\Psi \in \{E^p \times E^d\}, \text{rank}(\Psi) = p} B(\Psi), \quad (37)$$

is solved by using a numerical optimization algorithm, such as a gradient descent. This type of numerical optimization algorithm requires the gradient of $B(\Psi)$, which is defined as $$\nabla B(\Psi) = -\sum_{1 \leq i \leq j \leq C} \sqrt{p_{\omega_i} p_{\omega_j}}\, \exp(-\rho_\Psi(i,j)) \nabla \rho_\Psi(i,j) \quad (38)$$

where $$\nabla \rho_\Psi(i,j) = \frac{1}{2}(\Psi W_{ij} \Psi^T)^{-1}\left[\Psi S_{ij} - \Psi S_{ij} \Psi^T (\Psi W_{ij} \Psi^T)^{-1} \Psi W_{ij}\right] + \quad (39)$$

-continued $$(\Psi W_{ij} \Psi^T)^{-1} \Psi W_{ij} - \frac{1}{2}\left[(\Psi \Sigma_i \Psi^T)^{-1} \Psi \Sigma_i + (\Psi \Sigma_j \Psi^T)^{-1} \Psi \Sigma_j\right].$$

SUMMARY OF THE INVENTION

In consideration of the problems detailed above and the limitations enumerated in the partial solutions thereto, an object of the present invention is to provide a method for geometric linear discriminant analysis pattern recognition that finds a subset of features derived from an observation space.

Another object of the present invention is to provide a method for geometric linear discriminant analysis pattern recognition that reduces system complexity.

Another object of the present invention is to provide a method for geometric linear discriminant analysis pattern recognition that does not require matrix inversions.

Another object of the present invention is to provide a method for geometric linear discriminant analysis pattern recognition that reduces system complexity enabling more accurate estimates of the model parameters to be found.

Another object of the present invention is to provide a method for geometric linear discriminant analysis pattern recognition for ranking feature attributes in order of importance.

Another object of the present invention is to improve the accuracy and performance of pattern recognition.

Another object of the present invention is to reduce the time for a decision processor to determine the class identity.

Another object of the present invention is to enable the pattern recognition system designer to manage the complexity of the decision processor, as well as, controlling the robustness and accuracy of the pattern recognition system.

Another object of the present invention is to provide an analysis tool that can be used to determine the amount of discriminatory information a feature attribute contributes to the pattern recognition problem.

In order to attain the objectives described above, according to an aspect of the present invention, there is provided a method of geometric linear discriminant analysis pattern recognition whereby a subset, and in some cases an optimal subset, of feature attributes can be found for a pattern recognition system. Geometric linear discriminant analysis pattern recognition is an analysis tool that will rank feature attributes in order of importance. This ranking of feature importance gives way to a process that can search for feature attributes that contribute discriminatory information, thus enabling the creation of more mutually distinctive classes. Geometric linear discriminant analysis pattern recognition generates a family of classifiers in different dimensions. This family of classifiers enables the complexity of pattern recognition to be managed by system designers, allowing for system run times to be reduced by means of a transformation that decreases the dimension of the observation space. The creation of a pattern recognition system in a lower dimension allows system designers to find a better balance between the resources available to estimate model parameters and the number of parameters to estimate, thus leading to the development of more accurate models. This in turn leads to better classification performance. Geometric linear discriminant analysis pattern recognition is a method that addresses the "curse of dimensionality" by addressing the data sparsity issue at the root of the problem, the number of feature attributes in the observation space, i.e. dimension of the feature vector.

The method makes use of a geometric process that creates a matrix that can be used to reduce the dimension of the observation space by means of a linear transformation. The geometric process has a geometric interpretation that makes it easier to understand its functionality. This gives insight into understanding why this process succeeds or fails when applied. The geometric process does not require matrix inversions. Therefore, it is immune to the typical problems associated with ill-conditioned matrices or classification problems with highly correlated features. Compared to methods like those described in the description of prior art, the geometric criterion function uses a fewer number of assumptions about the problem, that is, the set of characteristics that a pattern recognition problem must exhibit in order for a method to operate in its best mode. Since there are fewer assumptions that restrict the scope of applicability, the geometric criterion function, except for a trivial case, does not have an analytical solution. A numerical optimization algorithm is used to maximize the geometric criterion function in order to calculate the linear transformation matrix. Although, the incorporation of a numerical optimization algorithm makes the geometric process a little more complicated, a substantial gain in the number of problems that can be solved is realized by having a fewer number of assumptions about the problem. Finally, the geometric process is different in its approach to the feature selection problem described in the description of the prior art. It is different from other methods in that it exploits the geometry of the class contours of constant density, when the classes are modeled statistically, to define the geometric criterion function. It selects convex contours of constant density for each class and compares distances between projected upper and lower bounds of those contours.

The aforementioned features, objects, and advantages of this method over the prior art will become apparent to those skilled in the art from the following detailed description and accompanying drawings.

BRIEF DESCRIPTION OF THE DRAWINGS

The invention can best be understood when reading the following specification with reference to the accompanying drawings, which are incorporated in and form a part of the specification, illustrate alternate embodiments of the present invention, and together with the description, serve to explain the principles of the invention. In the drawings.

DETAILED DESCRIPTION OF THE PREFERRED EMBODIMENTS

Figure 1:
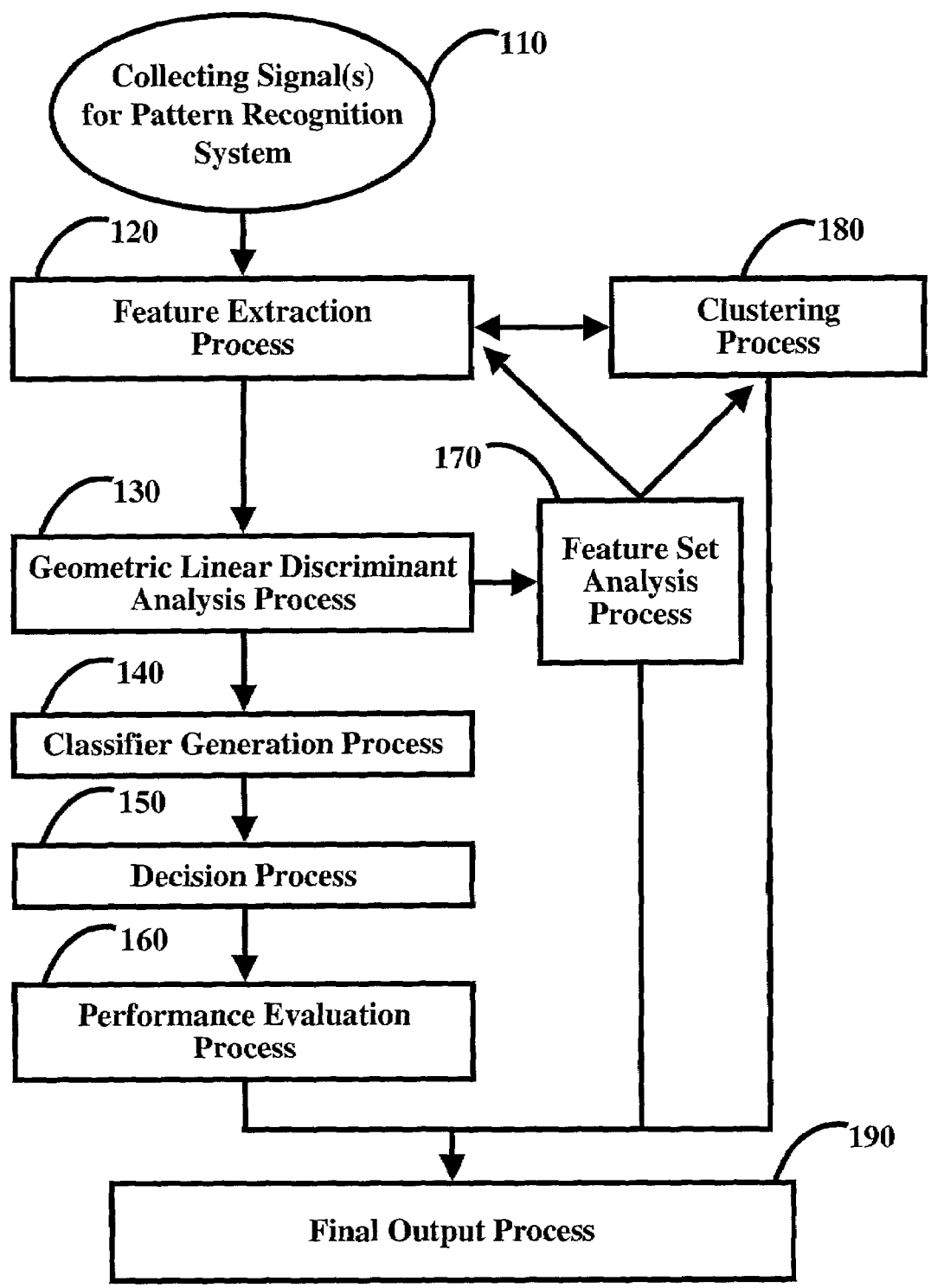
FIG. 1 is a flow chart diagram of the steps for a method of geometric linear discriminant analysis pattern recognition.

In one embodiment of the instant method invention, as shown in FIG. 1, a collection of raw continuous or discrete data is collected for input into the instant method for geometric linear discriminant analysis pattern recognition, step 110. As an exemplar, if the instant method were being used for speech recognition the data collected would be a continuous acoustic waveform of human speech.

In the next step, 120, the feature extraction process, features that are useful for the pattern recognition system are chosen and extracted from the raw data collected in step 110 and used to generate n feature vectors with d real-valued feature attributes. The feature vector is in dimension d and is paired with a class label. Often this class label will be known a priori based on the classes to be discriminated. In some cases, however, the a priori knowledge of the class to be paired with the feature attribution vector will not be available and the class will be labeled randomly, assigned a label in step 180, or with a best guess.

In our speech recognition exemplar, the continuous waveform might be divided into regular intervals of time. Each interval will have an associated class label, male or female. A spectral analysis is performed on each interval in order to generate real valued vectors representing the spectrum. For example, this vector may contain d real valued numbers, each representing a feature attribute to convey discriminatory information. In speech recognition these might be cepstral coefficients and their first and second derivatives.

In some embodiments, the data collected in step 110 will have been selected in such a manner that the useful features needed will have already been established and collected in a form compatible with pattern recognition. In a very simple case using our speech recognition example, if the class to be discriminated were only the sex of the speaker and the input data collected contained several single measurements, such as an estimation of the pitch frequency of the speaker's voice, then step 120 would generate a feature vector containing the measurements.

The next step, 130, the geometric linear discriminant analysis process, generates up to d−1 geometric discriminant vectors $w_j$, where $w_j$ is a d×1 vector and j is a control variable used in step 130, j=1, 2, . . . , p and p≦d−1. The p geometric discriminant vectors $w_j$ can be organized in a p×d matrix $\Psi_p$ as defined by equation (40), $$\Psi_p = \begin{bmatrix} w_1^T \\ w_2^T \\ \vdots \\ w_p^T \end{bmatrix}. \tag{40}$$

Figure 2:
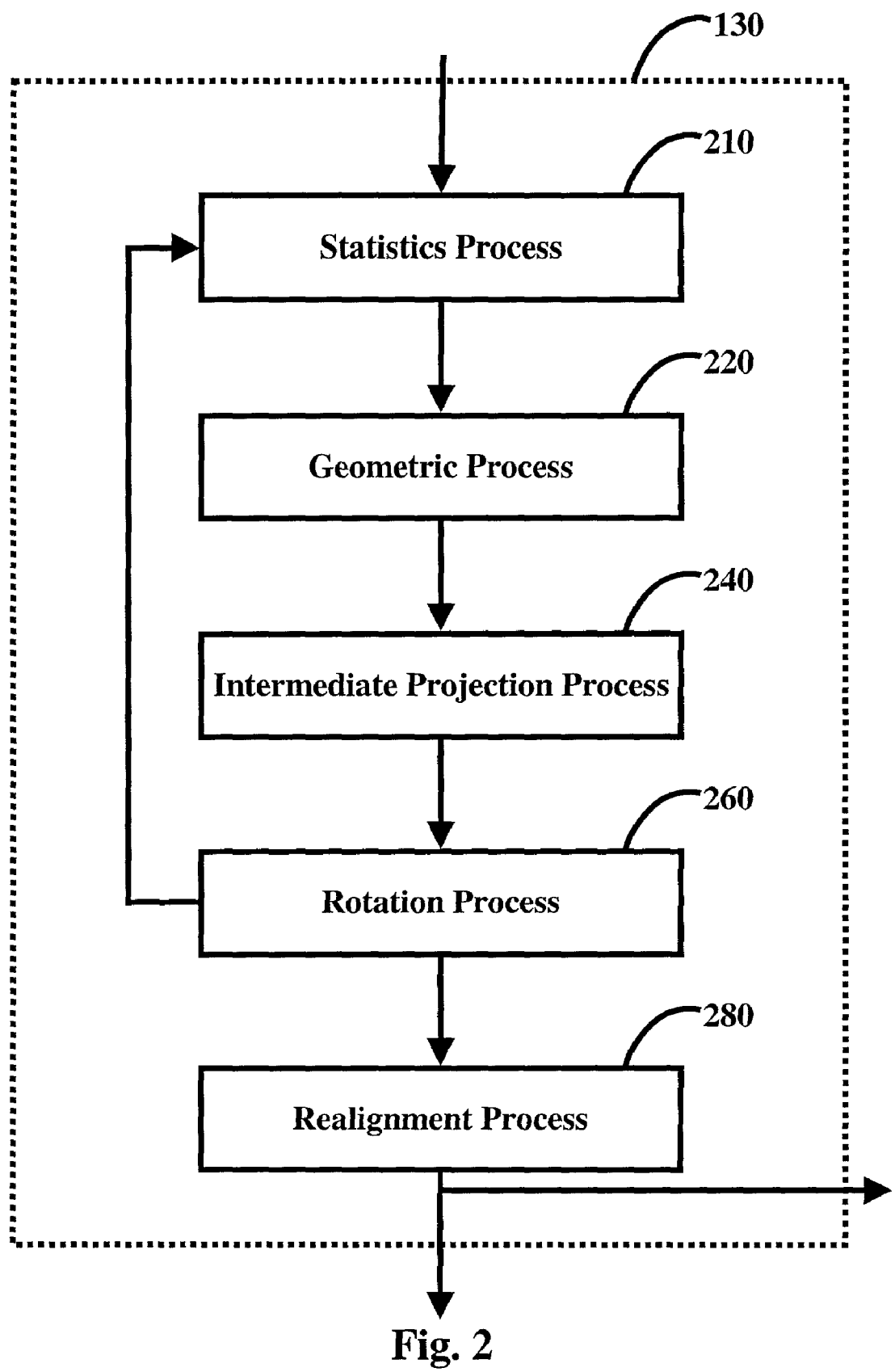
FIG. 2 is a flow chart showing greater detail for the geometric linear discriminant process step.

Step 130, is shown in detail in FIG. 2, wherein in step 210, the statistics process, statistics are initially calculated for each class given the d-dimensional features vectors x belonging to that class generated from step 120. As the dimension of the feature vectors are reduced, as a result of the looped steps 210, 220, 240, and 260, the input to step 210 is received from step 260 and statistics for m-dimensional features vectors x are calculated. The variable m is an integer that is initially equal to d, that is, when step 130 is invoked from step 120, otherwise 1<m<d. The statistics calculated are based on a convex set for each class used to describe the class identity. In some preferred embodiments, these convex sets are described using hyperellipsoids or convex hulls. In an embodiment, when the hyperellipsoid of constant Mahalanobis distance reasonably describes the contours of constant conditional density for the class distributions, the statistics calculated will be the mean and the covariance for each class. In other embodiments where the hyperellipsoid of constant Mahalanobis distance does not reasonably describe the contours of constant density for the class distributions, then a convex hull of the class feature vectors is used to represent the convex set for each class. In some embodiments when the convex set is described by a convex hull other statistics, such as the class mean and class covariance, will be calculated.

The next step, 220, the geometric process, generates an $m \times 1$ geometric discriminant vector z, which when padded with $j-1$ zeros at the end of the geometric discriminant vector z creates an intermediate geometric discriminant vector $\tilde{w}_j$.

Figure 3:
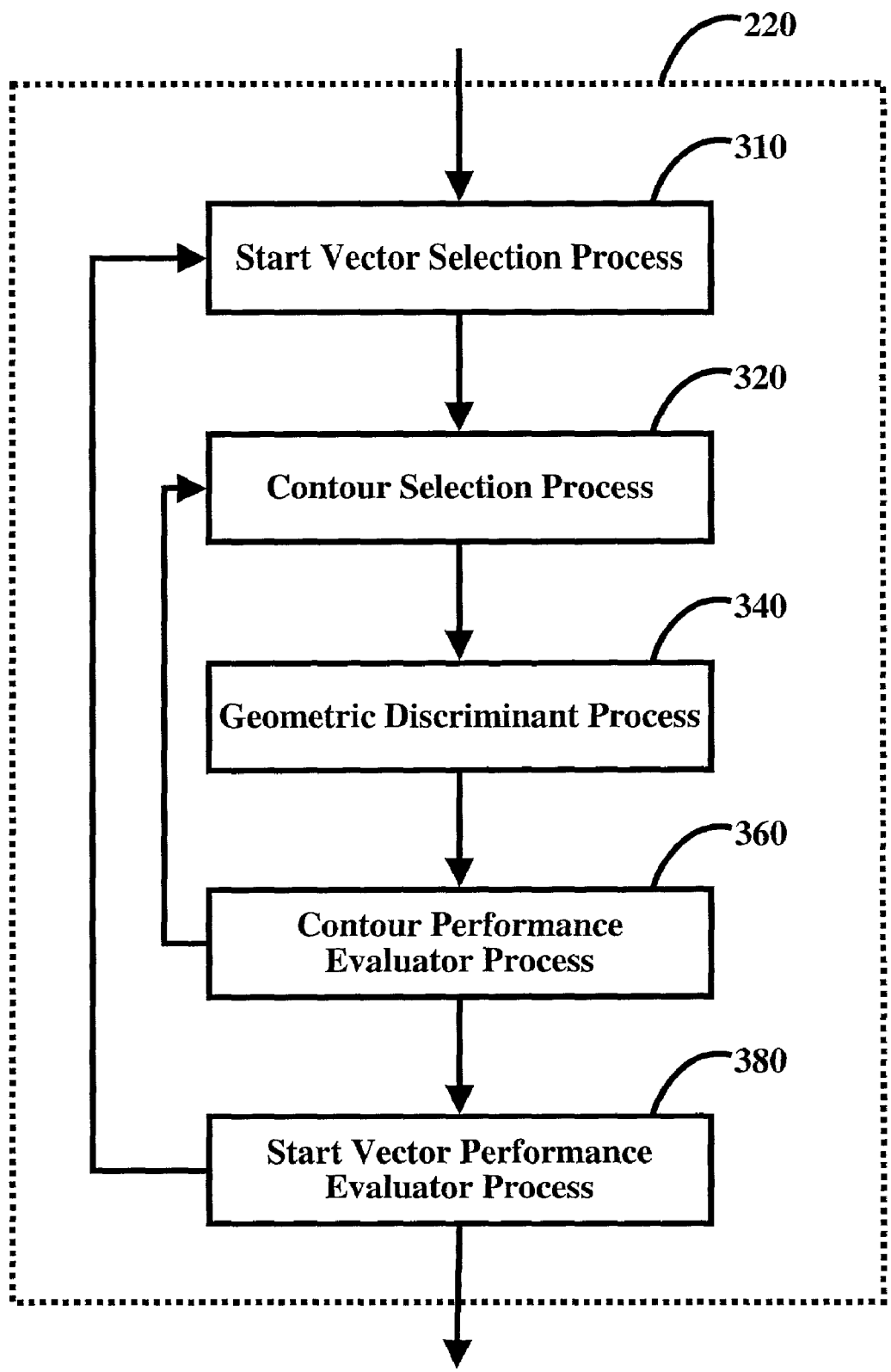
FIG. 3 is a flow chart showing greater detail for the geometric process step.

Step 220, is shown in detail in FIG. 3, wherein step 310, the start vector selection process, generates an $m \times 1$ vector s. The start vector s is used to initiate a numerical optimization algorithm for step 340. In a preferred embodiment, the start vector s is the Fisher linear discriminant vector (equation (16)) constructed from the statistics in step 210, the class mean vectors and class covariance matrices. In another embodiment, the start vector s is a vector with an L2-norm of one with randomly generated elements. When step 380 precedes step 310, in the loop shown in FIG. 3, the vector selection process generates a different start vector s, randomly or from another method like the Heteroscedastic LDA (equation (18)) to initiate a numerical optimization algorithm for step 340.

The next step, 320, the contour selection process, establishes one or more sets of class contour levels for the convex sets of step 210, the statistics process. The set of class contour levels consists of a specific contour level for each class based on the statistics from step 210. The set of class contour levels are utilized in step 340, the geometric discriminant process, to establish the geometric criterion function that compares distances between the projected lower and upper bounds of those class contours given a geometric discriminant vector z. The contour selection process establishes one or more sets of class contour levels that result in steps 320, 340, and 360 being executed for each set of class contour levels.

In a preferred embodiment, when the convex sets for each class are described by hyperellipsoids, the projected upper bound and the projected lower bound for every contour level can be described analytically using the assumption of normal class conditional densities. The class contour levels are set through real-valued parameter $\tilde{\gamma}_i$ for each class, which is indexed by the integer $i=1, 2, \ldots, C$, where C is the number of classes to be discriminated. The projected upper and lower bound of the class contours established by $\tilde{\gamma}_i$ are defined as follows.

Sets $H_i$ are constructed to describe the convex sets for each class, which are hyperellipsoids of a scaled constant conditional density. The sets $H_i$ are defined by equation (41), $$H_i = \{x \in E^m | p_i(x) p_{\omega_i} \geq \gamma_i\} \tag{41}$$

where x are the feature vectors for the $i^{th}$ class from the reduce process, step 470, or the feature extraction process, step 120; $p_i(x)$ is the class conditional density; $p_{\omega_i}$ is the class a priori probability, $\gamma_i > 0$, and $i=1, 2, \ldots, C$. When the conditional density is normal, that is, $p_i(x) = N(x; \mu_i, \Sigma_i)$ where $\mu_i$ is the class mean vector and $\Sigma_i$ is the class covariance matrix for the $i^{th}$ class, then the sets $H_i$ are defined by $$H_i = \{x \in E^m | 0.5(x - \mu_i)^T \Sigma_i^{-1} (x - \mu_i) \leq \tilde{\gamma}_i\}, \tag{42}$$

where $$\tilde{\gamma}_i = -\log_e \left[ \frac{\gamma_i (2\pi)^{n/2} |\Sigma_i|^{1/2}}{p_{\omega_i}} \right].$$

Given a non-zero geometric discriminant vector $z \in E^m$, let $\underline{v}_i$ and $\overline{v}_i$ be vectors in $H_i$ that satisfy $$z^T \underline{v}_i \leq z^T v \leq z^T \overline{v}_i, \forall v \in H_i. \tag{43}$$

Assuming $\gamma_i > 0$ and positive definite covariance matrices, then the sets $H_i$ are strictly convex, closed, and bounded and the vectors $\underline{v}_i$ and $\overline{v}_i$ are well defined. The projected lower bound is then defined as $L_i(z) = z^T \underline{v}_i$ and the projected upper bound as $U_i(z) = z^T \overline{v}_i$.

The necessary and sufficient condition to find $\underline{v}_i$ and $\overline{v}_i$ is a boundary vector on the hyperellipsoid defined by the following two equations:

$$\Sigma_i^{-1}(v_i - \mu_i) = -\lambda z, \text{ and} \tag{44}$$

$$0.5(v_i - \mu_i)^T \Sigma_i^{-1} (v_i - \mu_i) = \tilde{\gamma}_i. \tag{45}$$

Rewriting equation (44) as $(v_i - \mu_i) = -\lambda \Sigma_i z$ and inserting it into equation (45) we can solve for $\lambda$, where $$\lambda = \pm \frac{\sqrt{2\tilde{\gamma}_i}}{\sqrt{z^T \Sigma_i z}}. \tag{46}$$

From equation (44) we also have $v_i = \mu_i - \lambda \Sigma_i z$, and with the positive root of equation (46), the projected lower bound is defined as $$L_i(z) = z^T \mu_i - \sqrt{2\tilde{\gamma}_i} \sqrt{z^T \Sigma_i z}. \tag{47}$$

Similarly, with the negative root of equation (46), the projected upper bound is defined as $$U_i(z) = z^T \mu_i + \sqrt{2\tilde{\gamma}_i} \sqrt{z^T \Sigma_i z}. \tag{48}$$

The class contour level is incorporated in the definition of the lower and upper bounds $L_i(z), U_i(z)$ of equations (47) and (48), by the parameter $\tilde{\gamma}_i$.

The contour selection process incorporates three modes for selecting the set of class contour levels when the convex sets are represented by hyperellipsoids: 1) the user defined mode; 2) the non-projected mode; and 3) the projected mode. In a preferred embodiment, the user defined mode establishes a set of class contour levels by a user defined value for each parameter $\tilde{\gamma}_i$, where $\tilde{\gamma}_i > 0$ for $i = 1, 2, \ldots, C$.

Establishing one or more sets of class contour levels results in looped steps 320, 340, and 360 being executed for each of those sets.

In another embodiment, when the convex sets are represented by hyperellipsoids, the non-projected mode establishes a set of class contour levels so that each of the class contour levels are the same. That is, sets $H_i$, defined in equation (42) establish the same contour level for each class by setting $\gamma_i = \alpha$, where $\alpha$ is a real-valued constant. For the non-projected mode, the constant $\alpha$ is restricted to the open interval $$\left(0, \min_i \left[\frac{p_{\omega_i}}{(2\pi)^{m/2}|\Sigma_i|^{1/2}}\right]\right)$$

and given an $\alpha$ in that interval, the set of class contour levels are then defined as $$\tilde{\gamma}_i = -\log_e\left[\frac{\gamma_i(2\pi)^{m/2}|\Sigma_i|^{1/2}}{p_{\omega_i}}\right] \text{ for } i = 1, 2, \ldots, C \quad (49)$$

where $\gamma_i = \alpha$.

The lower bound and upper bound for $\alpha$ are defined as follows. Equation (41) was conditioned by $\gamma_i > 0$ and therefore $\alpha > 0$, which establishes the lower bound. Since the covariance matrix $\Sigma_i$ is positive definite as a condition for the sets $H_i$ being strictly convex, closed, and bounded, then from equation (42) $\tilde{\gamma}_i \geq 0.5(x-\mu_i)^T \Sigma_i^{-1}(x-\mu_i) > 0$. A new variable $$\xi_i = \frac{\gamma_i(2\pi)^{m/2}|\Sigma_i|^{1/2}}{p_{\omega_i}}$$

is defined, and using equation (42) $\tilde{\gamma}_i = -\log_e[\xi_i] > 0$ gives $\xi_i < 1$. Solving for $\gamma_i$ using the relation $\xi_i < 1$ results in $$\gamma_i < \left[\frac{p_{\omega_i}}{(2\pi)^{m/2}|\Sigma_i|^{1/2}}\right]$$

for each class. Thus, there exists an $\alpha$ such that $$\alpha < \left[\frac{p_{\omega_i}}{(2\pi)^{m/2}|\Sigma_i|^{1/2}}\right]$$

for each class, which establishes the upper bound.

In another embodiment, when the convex sets are represented by hyperellipsoids, the projected mode, establishes a set of class contour levels so that each of the projected class contours given a vector z are the same. Given the sets $H_i$ defined by equation (41) and a vector z, sets $G_i$ are constructed and defined as $$G_i = \{y \in E | p_i(y) p_{\omega_i} \geq \tau_i\}, \quad (50)$$

where y are linear transformed feature vectors for the $i^{th}$ class, that is, $y = z^T x$ where the feature vectors x are from the reduce process, step 470, or the feature extraction process, step 120; $p_i(y)$ is the class conditional density; $p_{\omega_i}$ is the class a-priori probability, $\tau_i > 0$, and $i = 1, 2, \ldots, C$.

When the conditional density functions for the sets $H_i$ are normal, then the conditional density functions for the sets $G_i$ are normal, that is, $p_i(y) = N(y; \mu_i, \sigma_i^2)$ where $\mu_i$ is a scalar class mean and $\sigma_i^2$ is a scalar class variance. Under this condition, the sets $G_i$ are constructed and defined as $$G_i = \left\{y \in E \left| \frac{(y-\mu_i)^2}{2\sigma_i^2} \leq \tilde{\tau}_i\right.\right\}, \quad (51)$$

where $$\tilde{\tau}_i = -\log_e\left[\frac{\tau_i\sqrt{2\pi}\,\sigma_i}{p_{\omega_i}}\right].$$

A set of class contour levels in the projected mode, where the contour level in the projected space is the same for each class, is established by setting $\tau_i = \beta$, where $\beta$ is a real-valued constant. For the projected mode, the constant $\beta$ is restricted to the open interval $$\left(0, \min_i \left[\frac{p_{\omega_i}}{\sqrt{2\pi\lambda_i}}\right]\right),$$

where $\lambda_i$ is the largest eigenvalue of covariance matrix $\Sigma_i$. Given a $\beta$ in that interval and a vector z, the set of class contour levels are defined as $$\tilde{\gamma}_i = -\log_e\left[\frac{\tau_i\sqrt{2\pi}\,\sqrt{z^T\Sigma_i z}}{p_{\omega_i}}\right] \text{ for } i = 1, 2, \ldots, C, \quad (52)$$

where $\tau_i = \beta$. When the projected mode is used, then equation (52) must be evaluated for each iteration of the numerical optimization algorithm in step 340.

The lower bound and upper bound for $\beta$ is defined as follows. Equation (50) was conditioned by $\tau_i > 0$ and therefore $\beta > 0$, which establish the lower bound. Since the covariance matrix $\Sigma_i$ is positive definite as a condition for the sets $H_i$ being strictly convex, closed and bounded, then from equation (51) $\sigma_i^2 = z^T\Sigma_i z > 0$ and $$\tilde{\tau}_i \geq \frac{(y-\mu_i)^2}{2\sigma_i^2} > 0.$$

By defining a new variable $$\xi_i = \frac{\tau_i\sqrt{2\pi}\,\sigma_i}{p_{\omega_i}}$$

and using equation (51), $\tilde{\tau}_i = -\log_e[\xi_i] > 0$ gives $\xi_i < 1$. Given that $\xi_i$ is maximized when the variance $\sigma_i^2$ is equal to the largest eigenvalue of $\Sigma_i$, which is denoted by $\lambda_i$, and then solving for $\tau_i$ using the relation $\xi_i<1$ results in $$\tau_i < \left[\frac{p_{\omega_i}}{\sqrt{2\pi\lambda_i}}\right]$$

for each class. Thus, there exists a $\beta$ such that $$\beta < \left[\frac{p_{\omega_i}}{\sqrt{2\pi\lambda_i}}\right]$$

for each class, which establishes the upper bound.

In another embodiment, when the calculated statistic from step 210 is a convex hull for each class, the projected upper bound and the projected lower bound of the class contours do not have an analytic form that can be used to represent multiple contour levels for each class. The convex hull generated for each class by step 210 is the boundary of the smallest convex domain in $E^m$ containing all the feature vectors x belonging to that class. In some embodiments, multiple convex hulls for a class, analogous to one or more sets of class contour levels for when the convex sets are described by hyperellipsoids, are generated by removing feature vectors that are outliers by some criterion. These feature vectors might be removed based on a criteria that will result in a maximum reduction of the volume of the convex hull, based on the maximum distance from the mean, or randomly through some iterative scheme.

The next step, 340, the geometric discriminant process, generates an m×1 geometric discriminant vector z by maximizing the geometric criterion function defined by equation (53), $$\hat{z} = \underset{z\in E^d, \|z\|=1}{\operatorname{argmax}} \frac{\min\{f_{(i,j)\min}(z)\}}{\max\{f_{(i,j)\max}(z)\}} \text{ for } i=1, \tag{53}$$

$$2, \ldots, C-1 \text{ and } j=1+1, i+2, \ldots, C,$$

where $$f_{(i,j)min}(z)=\max\{L_i(z),L_j(z)\}-\min\{U_i(z),U_j(z)\}, \tag{54}$$

$$f_{(i,j)max}(z)=\max\{U_i(z),U_j(z)\}-\min\{L_i(z),L_j(z)\}, \tag{55}$$

and $L_i(z)$ is the projected lower bound onto geometric discriminant vector z of the class contour for the $i^{th}$ class and $U_i(z)$ is the projected upper bound onto geometric discriminant vector z of the class contour for the $i^{th}$ class.

The motivation for the geometric criterion function can be illustrated by comparing two different projections of the class distributions from $E^2$, a two dimensional Euclidean space, onto E using the linear transformation $y=z^T x$. Consider a classification problem with two equally likely classes and class conditional densities that are normal, that is $$p_1(x) = N\left(x; \mu_1 = \begin{bmatrix} 1 \\ 1 \end{bmatrix}, \Sigma_1 = \begin{bmatrix} 27 & 2 \\ 2 & 1 \end{bmatrix}\right) \tag{56}$$

-continued $$p_2(x) = N\left(x; \mu_2 = \begin{bmatrix} -4 \\ 0 \end{bmatrix}, \Sigma_2 = \begin{bmatrix} 1 & 0 \\ 0 & 2 \end{bmatrix}\right).$$

The comparison is made using the discriminant vectors that are produced by the geometric process, shown in FIG. 2, step 220, and Fisher's LDA given by equation (16), which are $$\text{Geomtric Process } z = \begin{bmatrix} 0.9993 \\ 0.0378 \end{bmatrix} \text{ and} \tag{57}$$

$$\text{Fisher } LDA \ z = \begin{bmatrix} 0.5855 \\ 0.8107 \end{bmatrix}.$$

Figure 5:
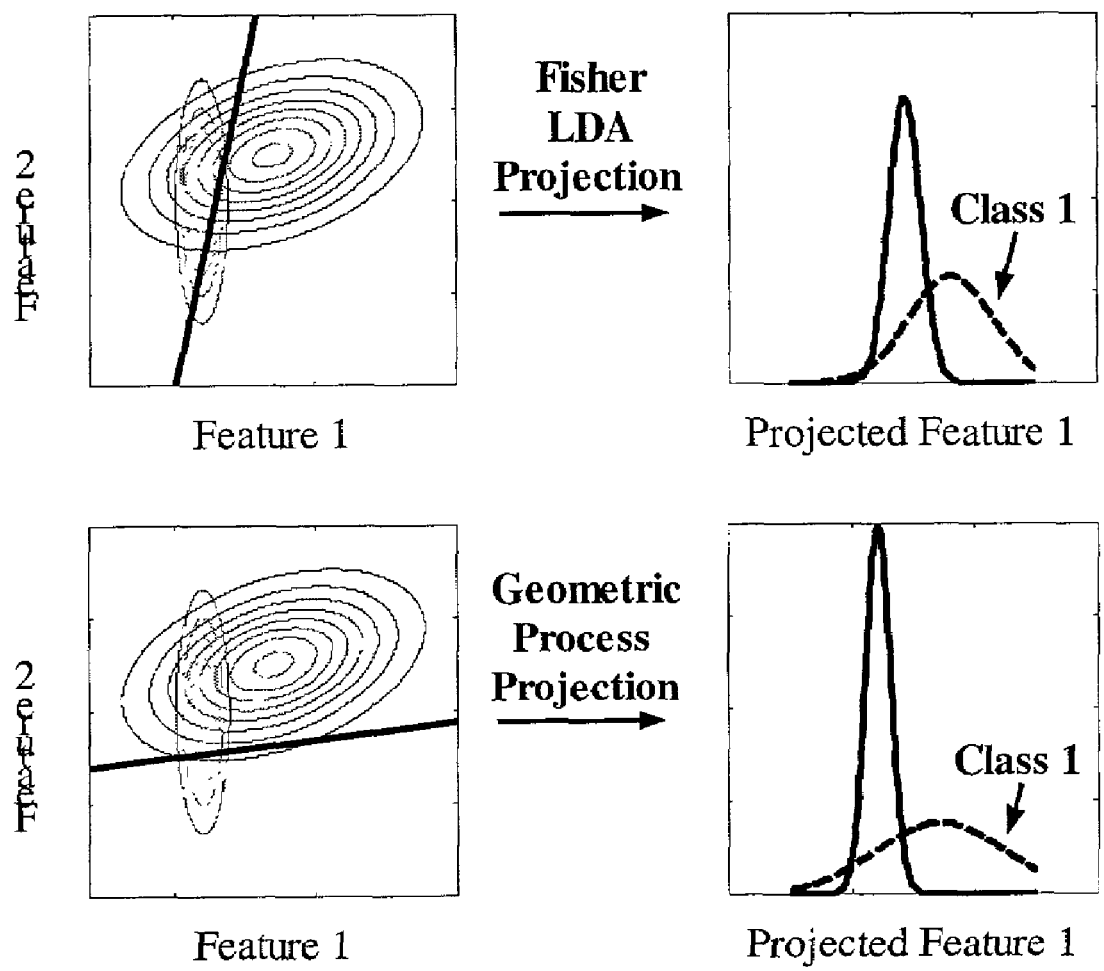
FIG. 5 is a picture of the geometric interpretation of the geometric discriminate process. The top left plot displays the class conditional density functions and a line to project the data onto based on Fisher's LDA. The top right plot is the resulting projected conditional density functions for each class. The bottom left plot displays the class conditional density functions and a line to project the data onto based on geometric discriminate vector z. The bottom right plot is the resulting projected conditional density function for each class.

The comparison starts with FIG. 5. In this figure, the 2-dimensional class conditional densities of equation (56) with the respective lines that represent the two projections in the direction of equation (57) are shown. The figure also shows the resulting 1-dimensional class conditional densities after the linear transformations $y=z^T x$ have been applied. The upper-half of the figure, which is an application of Fisher's LDA, displays the 2-dimensional class densities as a contour plot with a line in the direction of Fisher's LDA vector of (57). By projecting the 2-dimensional class densities onto that line, the resulting 1-dimensional densities are shown on the upper-right plot. Similarly, the bottom-half of the figure is an application of geometric process with the resulting 1-dimensional densities shown in the bottom-right plot. The upper-right and bottom-right plots are drawn using the same scale.

An intuitive look indicates that geometric process is closer to the "best" linear transformation when compared to Fisher's LDA. This can be verified by calculating the error rates for the classifier $g^*(x)$ defined by equation (11) and the two classifiers $g^*(y=z^T x)$ defined by (13), where z is one of the vectors from (57). A comparison of those classifiers is shown below. The classifier $g^*(y)$ cannot do better than the optimal classifier $g^*(x)$ in $E^2$. However, comparison below shows that geometric process is equivalent to the optimal classifier in E, which uses the "best" linear transformation. The "best" linear transformation was found by a brute force search over all possible linear transformations. This illustrative example demonstrates the geometric process. For this problem, it has been shown that geometric process obtains the best linear transformation. It can be shown how the geometric process accomplishes this by comparing the 1-dimensional class distributions from FIG. 5. The first thing that can be observed is that the distribution for class two is tighter in the case of geometric process. It is also possible to observe that the distribution for class one is wider resulting from the geometric process. Using this observation and given this problem, a process that makes the distribution of class two as tight as possible while the distribution of class one is as wide as possible is desirable. This can be done by creating a criterion function that uses the ratio of distances that measures the width of the projected distributions. The criterion function of the geometric process, known as the geometric criterion function defined by equation (53), does this by selecting convex contours of constant density for each class and compares distances between projected upper and lower bounds of those contours. The comparison of distances is done in such a way that finds a transformation to a lower dimension that provides the most amount of separation amongst the classes.

The following is a comparison of the total misclassification rate for four classifiers. The classifier in $E^2$ estimated the Bayes error probability through simulation. The error probability for the classifiers in E was found by integrating the probability of error function.

TABLE 1

| | Optimal Classifier in $E^2$ $g^*(x)$ | Optimal Classifier in E $g^*(z^{*T}x)$ | Geometric LDA Classifier in E $g^*(z^Tx)$ | Fisher LDA Classifier in E $g^*(z^Tx)$ |
|---|---|---|---|---|
| Error Rate | 11.0% | 11.7% | 11.7% | 17.2% |

In an embodiment, when the convex sets are represented by hyperellipsoids, the projected lower bound $L_i(z)$ and the projected upper bound $U_i(z)$ are defined by equations (47) and (48) respectively. The maximization of equation (53) can be accomplished by a numerical optimization algorithm, for example, a gradient ascent algorithm. The gradient of equation (53), the geometric criterion function, is defined as follows. There exist indices k, l, m, n∈{1, 2, ..., C}, where these indices are only relevant to equations (58), (59), and (60), for each geometric discriminant vector z. Using these indices, the geometric criterion function can be rewritten as $$f(z) = \frac{f_{\min}(z)}{f_{\max}(z)} = \frac{\min\{f_{(i,j)\min}(z)\}}{\max\{f_{(i,j)\max}(z)\}} = \frac{L_k(z) - U_l(z)}{U_m(z) - L_n(z)}. \quad (58)$$

The gradient of the geometric criterion function, making use of derivatives of matrices is defined as $$\nabla f(z) = \frac{f_{\max}(z)\nabla f_{\min}(z)^T - f_{\min}(z)\nabla f_{\max}(z)^T}{f_{\max}(z)^2}, \quad (59)$$

where $$\nabla f_{\min}(z)^T = (\mu_k - \mu_l) - \frac{\sqrt{2\tilde{\gamma}_k}}{\sqrt{z^T\Sigma_k z}}\Sigma_k z - \frac{\sqrt{2\tilde{\gamma}_l}}{\sqrt{z^T\Sigma_l z}}\Sigma_l z, \text{ and} \quad (60)$$

$$\nabla f_{\max}(z)^T = (\mu_m - \mu_n) + \frac{\sqrt{2\tilde{\gamma}_m}}{\sqrt{z^T\Sigma_m z}}\Sigma_m z + \frac{\sqrt{2\tilde{\gamma}_n}}{\sqrt{z^T\Sigma_n z}}\Sigma_n z.$$

In another embodiment, when the convex sets are represented by convex hulls, the projected lower bound $L_i(z)$ and the projected upper bound $U_i(z)$ are defined as $$L_i(z) = \min_{x \in D_i} z^T x, \text{ and} \quad (61)$$

$$U_i(z) = \max_{x \in D_i} z^T x, \quad (62)$$

where $D_i$ is the set of feature vectors for the $i^{th}$ class from the reduce process, step 470 or the feature extraction process, step 120 that is the boundary of the smallest convex domain in $E^m$ containing all the feature vectors belonging to the $i^{th}$ class. Of course, if it is desirable not to determine the set $D_i$ for the convex hull then $D_i$ is all feature vectors belonging to that class. The maximization of equation (53) can be accomplished by a numerical optimization algorithm, like a gradient ascent algorithm. The gradient, in this case, can be estimated by finite differences, which is the discrete analog derivative. The estimation of the gradient, as defined by equation (63), $$\nabla f(z) = \begin{bmatrix} \frac{\partial f(z)}{z_1} \\ \frac{\partial f(z)}{z_2} \\ \vdots \\ \frac{\partial f(z)}{z_m} \end{bmatrix}, \quad (63)$$

by finite differences requires m+1 calculations of the geometric criterion function (53).

The interaction from step 310, the start vector selection process, to step 340, the geometric discriminant process, provides an initial guess for the geometric discriminant vector z to seed the numerical optimization algorithm used to maximize equation (53). Step 310 provides one or more initial guesses for the geometric discriminant vector z, thus creating looped steps 310, 320, 340, 360, and 380.

The interaction from step 320, the contour selection process, to step 340, the geometric discriminant process, provides a set of class contour levels when the convex sets are described by hyperellipsoids or convex hulls for each class to establish the geometric criterion function that compares distances between the projected lower and upper bounds of those class contours given a geometric discriminant vector z. Step 320 provides one or more sets of class contour levels or convex hulls, thus creating looped steps 320, 340, and 360.

The next step, 360, the contour performance evaluator process, selects the best geometric discriminant vector z. The selection of the best geometric discriminant vector z is based on step 340 generating a set of geometric discriminant vectors from different class contour levels from looped steps 320, 340, and 360. In a preferred embodiment, the best geometric discriminant vector z is the one with the fewest number of misclassifications using the class feature vectors from the statistics process, step 210. The number of misclassified data vectors can be based on, for example, a nearest neighbor classifier or a classifier such as the one described by equations (8) through (14). Step 360 loops next to step 320, until all the contour levels specified in step 320 have generated a geometric discriminant vector z. The best m×1 geometric discriminant vector z is passed on to step 380.

Step 380, the start vector performance evaluator process, selects the best geometric discriminant vector z. The selection of the best geometric discriminant vector z is based on looped steps 310, 320, 340, 360, and 380 generating a set of geometric discriminant vectors from different start vectors s established in step 310. In a preferred embodiment, the best geometric discriminant vector z is the one with the fewest number of misclassifications using the class data vectors from the statistics process, step 210. The number of misclassified data vectors can be based on, for example, a nearest neighbor classifier or a classifier such as the one described by equations (8) through (14). Step 380 loops next to step 310, until all the start vectors s specified in step 310 have generated a geometric discriminant vector z through steps 310, 320, 340, 360, and 380. The best m×1 geometric discriminant vector z is padded with j−1 zeros, where j is a control variable established in step 130, to create a d×1 intermediate geometric discriminant vector $\tilde{w}_j$, which is passed on to step 240.

Step 240, the intermediate projection process, calculates a transformation so that every feature vector from the statistics process, step 210, is orthogonal to the m×1 geometric discriminant vector z, which consists of the first m elements of the d×1 intermediate geometric discriminant vector $\tilde{w}_j$, from step 220. In a preferred embodiment, the transformation is accomplished by defining a m×m matrix A, which is defined by equation (64), $$A = I - zz^T, \tag{64}$$

where I is an m × m identity matrix. Given the feature vectors from step 210 represented by the vectors x, a linear transformation is applied to each vector x, $y=A^Tx$, where A is defined by equation (64) and y is the transformed feature vectors. This transformation makes every feature vector y orthogonal to the m×1 geometric discriminant vector z.

The next step, 260, the rotation process, generates a rotation m×m matrix R that reduces the m-dimensional feature vectors y, defined by step 240, to (m−1)-dimensional feature vectors. The rotation process also generates a rotation d×d matrix $\tilde{R}_j$ for step 280, the realignment process. The rotation matrix $\tilde{R}_j$ stores the rotation transformations applied to the first m elements of the intermediate geometric discriminant vectors $\tilde{w}_j$ so that step 280 can restore $\tilde{w}_j$ to its original orientation, the geometric discriminant vectors $w_j$. When the control variable j is equal to p (both established in step 130), then the next step is step 280, otherwise the (m−1)-dimensional feature vectors are passed to step 210 and the control variable is updated to j=j+1.

Figure 4:
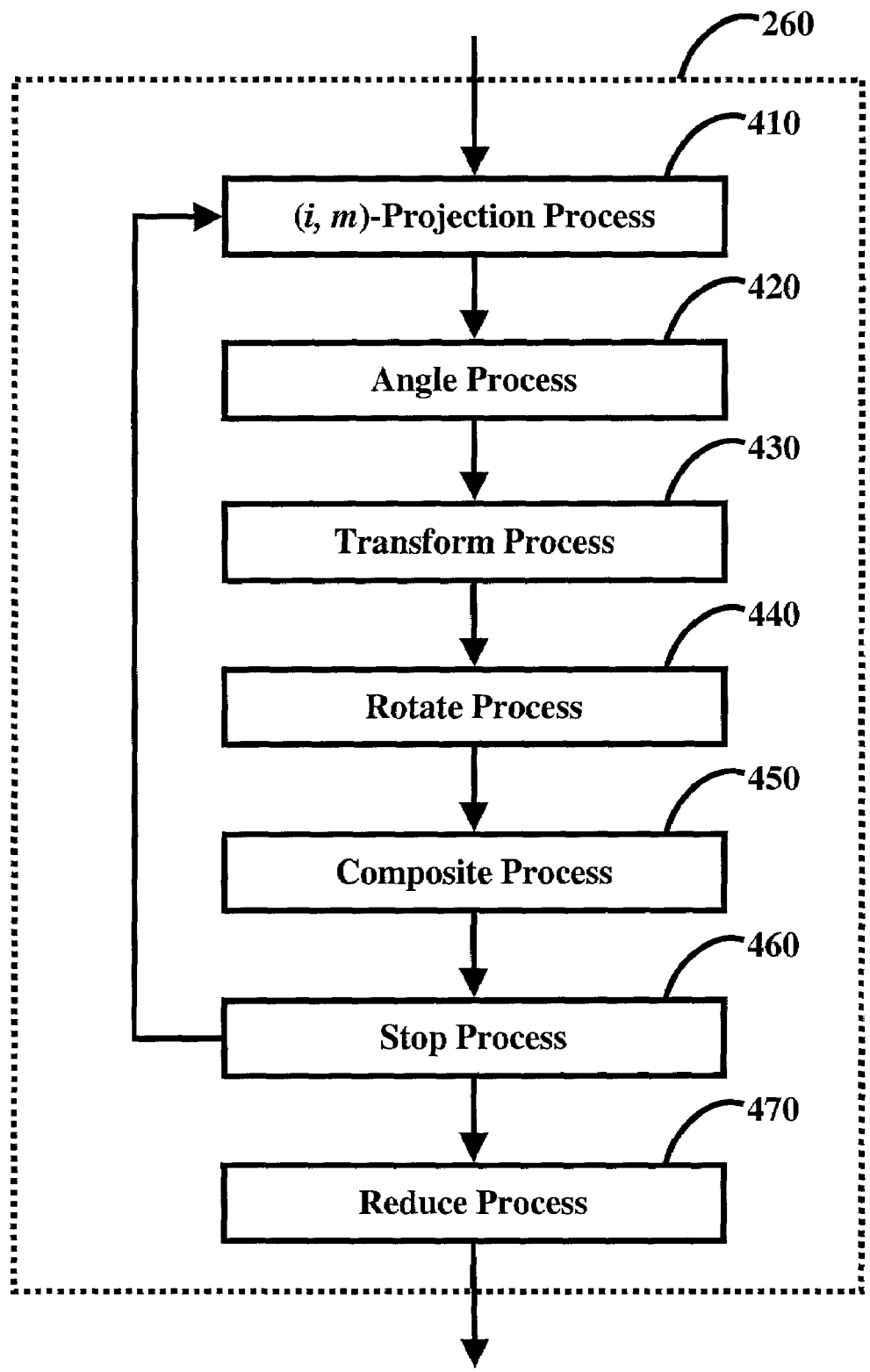
FIG. 4 is a flow chart showing greater detail for the rotation process.

Step 260, the rotation process, is shown in detail in FIG. 4, wherein step 410, the (i, m)-projection process, an m×1 vector v is projected onto the (i, m)-plane, where i is a control variable in step 260. When step 260 is invoked from step 240, then step 410 sets i=1, a vector v equals the geometric discriminant vector z, and the rotation m×m matrix R is the identity matrix, otherwise step 410 does not update these variables. The projection of vector v onto the (i, m)-plane is accomplished by a linear transformation $\hat{v}=Pv$, where P is a 2×m matrix with the first row vector having all elements equal to zero except the $i^{th}$ element that is equal to one, and the second row vector having all elements equal to zero except the $m^{th}$ element that is equal to one. In most embodiments, it is convenient to normalize the vector $\hat{v}$ so that the L2-norm is equal to one.

The next step, 420, the angle process, calculates the angle θ between the projected vector $\hat{v}$ and the vector $$\begin{bmatrix} 0 \\ 1 \end{bmatrix}.$$

The next step, 430, the transform process, calculates a transformation matrix Q that will rotate vector v on the (i, m)-plane with angle θ, calculated in step 420, from the i-axis (a vector represented by the first row vector of P from step 410) to the m-axis (a vector represented by the second row vector of P from step 410). Every element of the m×m matrix Q is zero except for the elements defined by equation (65), $$Q_{i,i} = Q_{m,m} = \cos \theta$$

$$Q_{i,m} = -\sin \theta \text{ and } Q_{m,i} = \sin \theta, \tag{65}$$

$$Q_{k,k} = 1 \text{ for } k \neq i \text{ and } k \neq m$$

where the first subscript indicates the row and the second subscript indicates the column of an element in Q.

The next step, 440, the rotate process, applies the transformation matrix Q from step 430 to vector v to create an updated vector v=Qv.

The next step, 450, the composite process, updates the m × m rotation matrix R using the transformation R=QR, where Q is the transformation matrix from step 430.

The next step, 460, the stop process, updates the control variable i=i+1 and while i<m loops back to step 410, otherwise, when i=m, the next step is step 470, the reduce process.

Step 470, the reduce process, applies the m×m rotation matrix R to reduce the m-dimensional feature vectors y from step 240 to (m−1)-dimensional feature vectors. The dimension reduction of the feature vectors y is accomplished by applying the linear transformation u=Ry to every feature vector y to create new feature vectors u where the $m^{th}$ feature attribute of every vector is zero and therefore can be removed. These new (m−1)-dimensional feature vectors u are the input feature vectors for step 210, the statistics process. The d×d matrix R is created by extending the m×m matrix R using equation (66), where I is a (d−m)×(d−m) identity matrix such that $$\tilde{R}_j = \begin{bmatrix} R & 0 \\ 0 & I \end{bmatrix}. \tag{66}$$

Step 280, the realignment process, applies the rotation transformations $\tilde{R}_j$ from step 260 to the intermediate geometric discriminant vectors $\tilde{w}_j$ to restore its original orientation, the geometric discriminant vectors $w_j$. When step 260 transitions to step 280, there are p intermediate geometric discriminant vectors $\tilde{w}_j$ that have an incorrect orientation to each other because of step 240, and step 260. The correct orientation for each intermediate geometric discriminant can be recovered by applying the d×d rotation matrix $\tilde{R}_j$ using equation (67), $$w_j = \left( \prod_{i=1}^{j-1} \tilde{R}_i^T \right) \tilde{w}_j, \text{ for } j = 1, 2, \ldots, p, \tag{67}$$

This will ensure all geometric discriminants $w_j$ are properly oriented to the standard orthonormal basis.

Step 140, the classifier generation process, uses the p×d matrix $\Psi_p$ from step 130 to generate a family of classifiers. One of the classifiers in the family uses the first row vector of $\Psi_p$, $w_1$, to reduce the d-dimensional feature vectors x from step 120 to a scalar feature values y by means of a linear transformation $y = w_1 x$. The classifier is then created, using for example, Bayes decision rule or the nearest neighbor classifier, based on the scalar feature values y. Another classifier in the family uses the first m row vectors of $$\Psi_p, A = \begin{bmatrix} w_1^T \\ w_2^T \\ \vdots \\ w_m^T \end{bmatrix},$$

to reduce the d-dimensional feature vectors x from step 120 to an m-dimensional vector y by means of a linear transformation y=Ax. The classifier is then created, again using for example, Bayes classifier or the nearest neighbor classifier, based on the m-dimensional feature vectors y. In general, the number of classifiers in the family are the number of p classifiers allowed by the linear transformation matrix $\Psi_p$ on the feature vectors x plus the classifier based on the d-dimensional feature vectors x.

The next step, 150, the decision process, applies the decision rule for the feature vectors from step 120 using the family of classifiers generated in step 140. That is, each classifier in the family assigns a hypothesized class label to each feature vector. For the speech recognition exemplar, the hypothesized words from a given speech utterance would be generated.

The next step, 160, the performance evaluation process, determines the accuracy of each classifier in the family based on the decision process of step 150. In a preferred embodiment, the number of misclassified feature vectors can be counted. In another embodiment, the equal error rate of each classifier in the family can be calculated. In another embodiment, a detection error tradeoff curve can be computed. In the speech recognition exemplar, the performance could measure the number of correctly recognized words.

Step 170, the feature set analysis process, makes use of the p×d matrix $\Psi_p$ from step 130 to determine the amount of discriminatory information a particular feature attribute in the feature vector provides. In a preferred embodiment, the absolute value of the elements of a row vector from $\Psi_p$ indicates the amount of discriminatory information a particular feature provides to the process relative to the other feature attributes. For instance, the feature attribute with the highest rank for the first row vector of $\Psi_p$ indicates the most important feature attribute. The second most important feature is identified by the highest ranked feature attribute in the second row vector of $\Psi_p$. This ranking process continues for each row vector in $\Psi_p$. As shown in FIG. 1, steps 120, 130, and step 170 create a looped process where new feature attributes generated from step 120 can be evaluated for discriminatory information. For example, feature attributes that have a ranking close to zero are no longer be passed from step 120 to step 130.

Step 180, the clustering process, makes use of unsupervised or supervised clustering algorithms. In a preferred embodiment, the clustering process assigns class labels to the unlabeled feature vectors from step 120 by using an unsupervised clustering algorithm, such as k-means clustering. In another embodiment, clustering algorithms are used to reduce the number of classes to be discriminated by the classifiers defined in step 140. In another embodiment, a subset of feature attributes generated from the feature set analysis process, step 170, or a linear weighted feature set using the p×d matrix $\Psi_p$ is used to create new feature vectors y=$\Psi_p$x in a reduced dimension to serve as an input for a clustering algorithm.

Step 190, the final output process, is charged with properly formatting the output of steps 160, 170, or 180 for useful consumption by other devices or methods. In the case, of step 160 invoking step 190, the final output process picks the best classifier from the family of classifiers. In the case of step 170 invoking step 190, the final output process presents the feature rankings by means of $\Psi_p$. In the case, of step 180 invoking step 190, the final output process presents the clusters and cluster labels for additional processing by other devices or methods.

In practice, in a preferred embodiment of the method system would be executed using two different sets, the training data set, and the evaluation data set. When the collection of signal(s) for step 110 is the training data set, then the method of geometric linear discriminant analysis pattern recognition follows the description of the preferred embodiments. When the collection of signal(s) for step 110 is the evaluation set, then step 130, the geometric linear discriminant analysis process, would also execute as described in the preferred embodiments. However, in a preferred embodiment the p×d matrix $\Psi_p$ passed to step 140, the classifier generation process, would be the p×d matrix $\Psi_p$ calculated by step 130 when the collection of signal(s) for 110 is the training data set. When the instant method is applied with two data sets, the training data set and the evaluation data set, the final output process, step 190, prepares the matrix $\Psi_p$ determined by the training data set and the matrix $\Psi_p$ determined by the evaluation data set for comparison. In a preferred embodiment, the comparison of the two matrices $\Psi_p$ is a measure of change of the feature attribute rankings.

Although various preferred embodiments of the present invention have been described herein in detail to provide for complete and clear disclosure, it will be appreciated by those skilled in the art, that variations may be made thereto without departing from the spirit of the invention or the scope of the appended claims.

What is claimed is:

1. A method of geometric linear discriminant analysis pattern recognition, comprising the steps of:
    (a) specifying a plurality of classes for distinguishing a plurality of objects in an observation space, each of said classes having a class label;
    (b) collecting data about said plurality of objects in said observation space, with each of said datum having at least one feature attribute;
    (c) extracting said feature attributes from said data for each of said classes;
    (d) generating at least one d-dimensional feature vector having at least one of said feature attributes, where d is equal to the number of said feature attributes for each of said classes;
    (e) pairing each of said d-dimensional feature vectors with one of said class labels;
    (f) choosing a p number, for reducing the number of said feature attributes in said d-dimensional feature vectors to p, where p is at least one and no more than d−1;
    (g) generating p, d-dimensional geometric discriminant vectors from a subset of said d-dimensional feature vectors;
    (h) generating a p×d geometric matrix from said d-dimensional geometric discriminant vectors;
    (i) generating at least one classifier from said p×d geometric matrix, each of said classifiers defining a decision rule for determining said class of one of said objects;
    (j) applying the decision rule from each of said classifiers for each of said d-dimensional feature vectors for generating said class label for one of said objects; and (k) determining a performance for each of said classifiers.

2. The method of claim 1, further comprising the step of determining an amount of discriminatory information each of said feature attributes provides for each of said classifiers.

3. The method of claim 2, further comprising the step of using at least one clustering algorithm to assign said class labels to said d-dimensional feature vectors.

4. The method of claim 1, wherein said step of generating a p×d geometric matrix from said d-dimensional geometric discriminant vectors, where p is equal to the number of said d-dimensional geometric discriminant vectors further comprises the steps of:
  (a) initializing by creating at least two m-dimensional feature vectors equal to said d-dimensional feature vectors and setting m equal to d;
  (b) for each integer j, taking the values of 1 through p inclusive by increments of 1:
    (i) calculating statistics for said m-dimensional feature vectors;
    (ii) generating an m-dimensional geometric discriminant vector from said statistics;
    (iii) creating a $j^{th}$ d-dimensional intermediate geometric discriminant vector from said m-dimensional geometric discriminant vector;
    (iv) creating an orthogonal m-dimensional feature vector from said m-dimensional geometric discriminant vector;
    (v) creating an (m−1)-dimensional feature vector from each of said orthogonal m-dimensional feature vectors using said m-dimensional geometric discriminant vector and generating a $j^{th}$ d×d rotation matrix documenting how said step of creating an (m−1)-dimensional feature vector from each of said orthogonal m-dimensional feature vectors using said m-dimensional geometric discriminant vector was accomplished; and
    (vi) decrementing m by 1; and
  (c) for each integer j, taking the values of 1 through p inclusive, by increments of 1:
    (i) generating the $j^{th}$ d-dimensional geometric discriminant vector by applying the $1^{st}$ through the $(j-1)^{th}$ of said d×d rotation matrices to the $j^{th}$ d-dimensional intermediate geometric discriminant vector; and
    (ii) inserting said $j^{th}$ d-dimensional geometric discriminant vector into the $j^{th}$ row of said p×d geometric matrix.

5. The method of claim 4, wherein said step of generating an m-dimensional geometric discriminant vector from said statistics further comprises the steps of:
  (a) choosing the number, k, of m-dimensional start vectors desired;
  (b) for each integer i, taking the values of k through 1 inclusive by decrements of 1:
    (i) generating an m-dimensional start vector;
    (ii) choosing the number, n, of sets of class contour levels desired;
    (iii) for each integer q, taking the values of n through 1, inclusive by decrements of 1:
      (A) establishing a set of class contour levels;
      (B) generating an m-dimensional geometric discriminant vector; and
      (C) selecting an optimum one of said m-dimensional geometric discriminant vectors from each of said set of class contour levels; and
    (iv) selecting an optimum one of said geometric discriminant vectors from each of said m-dimensional start vectors.

6. The method of claim 4, wherein said step of creating an (m−1)-dimensional feature vector from each of said orthogonal m-dimensional feature vectors using said m-dimensional geometric discriminant vector and generating a $j^{th}$ d×d rotation matrix documenting how said step of creating an (m−1)-dimensional feature vector from each of said orthogonal m-dimensional feature vectors using said m-dimensional geometric discriminant vector was accomplished, further comprises the steps of:
  (a) initializing by setting an m-dimensional temporary vector equal to said m-dimensional geometric discriminant vector, by setting an m×m temporary rotation matrix equal to an m×m identity matrix, and by creating a base vector having two elements with the first of said elements equal to 0 and the second of said elements equal to 1;
  (b) for each integer r, taking the values of 1 through m−1 inclusive by increments of
    (i) projecting said m-dimensional temporary vector onto an (i, m)-plane, creating a projected m-dimensional temporary vector;
    (ii) calculating the angle between said projected m-dimensional temporary vector and said base vector;
    (iii) calculating an m × m transformation matrix that will rotate the said m-dimensional temporary vector using said angle between said projected m-dimensional temporary vector and said base vector;
    (iv) applying said m×m transformation matrix to said m-dimensional temporary vector; and
    (v) updating said m×m temporary rotation matrix using said m×m transformation matrix;
  (c) transforming said m-dimensional feature vectors by applying said m×m transformation matrix to the m-dimensional feature vectors;
  (d) creating said (m−1)-dimensional feature vector by removing the $m^{th}$ feature attribute from all of said m-dimensional feature vectors; and
  (e) creating the $j^{th}$ d×d rotation matrix block diagonalizing said m×m transformation matrix with a (d−m)×(d−m) identity matrix.

7. The method of claim 1, wherein said class label is known a priori.

8. The method of claim 1, wherein said class label is randomly designated.

9. The method of claim 1, wherein said feature attributes of said data are known a priori.

10. The method of claim 1, wherein said step of generating at least one classifier from said p×d geometric matrix further comprises the steps of creating said classifiers using Bayes decision rule.

11. The method of claim 1, wherein said step of generating at least one classifier from said p×d geometric matrix further comprises the steps of creating said classifiers using a nearest neighbor classifier.

12. The method of claim 1, wherein said step of generating at least one classifier from said p×d geometric matrix further comprises the steps of creating said classifiers by selecting a number of consecutive initial rows of said p×d geometric matrix.

13. The method of claim 1, wherein said step of determining a performance for each of said classifiers further comprises the step of counting the number of said class labels for each of said d-dimensional feature vectors for each of said classifiers, which are incorrectly paired with one of said classes.

14. The method of claim 1, wherein said step of determining a performance for each of said classifiers further comprises the step of calculating an equal error rate for each of said classifiers.

15. The method of claim 1, wherein said step of determining a performance for each of said classifiers further comprises the step of computing a detection error tradeoff curve.

16. The method of claim 1, wherein said data is discrete.

17. The method of claim 1, wherein said data is continuous.

18. The method of claim 2, wherein said step of determining an amount of discriminatory information each of said feature attributes provides for each of said classifiers further comprises the step of calculating a rank of said feature attributes by taking an absolute value of the elements of said p×d geometric matrix.

19. The method of claim 3, wherein said clustering algorithm further comprises unsupervised clustering algorithms.

20. The method of claim 3, wherein said clustering algorithm further comprises supervised clustering algorithms.

21. The method of claim 3, wherein said clustering algorithm further comprises at least one k-means clustering algorithm.

22. The method of claim 3, wherein said step of using at least one clustering algorithm to assign said class labels to said d-dimensional feature vectors further comprises the step of using said clustering algorithms to reduce the number of said classes for said step of generating at least one classifier from said p×d geometric matrix, each of said classifiers defining a decision rule for determining said class of one of said objects.

23. The method of claim 3, wherein said step of determining an amount of discriminatory information each of said feature attributes provides for each of said classifiers further comprises the steps of:
 (a) for each of said classifiers, generating a subset of said feature attributes generated from said step of determining an amount of discriminatory information each of said feature attributes provides for each of said classifiers;
 (b) for each of said classifiers, creating new feature vectors containing said subset of said feature attributes; and
 (c) for each of said classifiers, equating said d-dimensional feature vectors to said new feature vectors with d equal to the number of feature attributes in each of said subsets of said feature attributes.

24. The method of claim 3, wherein said step of using at least one clustering algorithm to assign said class labels to said d-dimensional feature vectors further comprises the steps of:
 (a) for each of said classifiers, generating a linear weighted combination of said feature attributes from said p×d geometric matrix;
 (b) for each of said classifiers, creating a new feature vector containing said linear weighted combination of said feature attributes; and
 (c) for each of said classifiers, equating said d-dimensional feature vectors to said new feature vectors with d equal to p.

25. The method of claim 4, wherein said step of calculating statistics for said m-dimensional feature vectors further comprises the step of creating a convex set for each of said classes.

26. The method of claim 4, wherein said step of calculating statistics for said m-dimensional feature vectors further comprises the steps of:
 (a) creating a convex set for each of said classes; and
 (b) creating a hyperellipsoid for each of said classes for said convex sets.

27. The method of claim 4, wherein said step of calculating statistics for said m-dimensional feature vectors further comprises the steps of:
 (a) creating a convex set for each of said classes; and
 (b) creating a convex hull for each of said classes for said convex sets.

28. The method of claim 26, wherein said step of calculating statistics for said m-dimensional feature vectors further comprises the step of calculating the mean and covariance for each of said classes.

29. The method of claim 26, wherein each of said classes is described by a probability distribution function.

30. The method of claim 29, wherein said probability distribution function has at least one contour of constant conditional density having a constant Mahalanobis distance determined by said mean and said covariance for said class.

31. The method of claim 27, wherein said step of calculating statistics for said m-dimensional feature vectors further comprises the step of calculating the mean and covariance for each of said classes.

32. The method of claim 4, wherein said step of creating an orthogonal m-dimensional feature vector from said m-dimensional geometric discriminant vector further comprises of the steps of:
 (a) generating an m×m transform matrix by subtracting the vector direct product of said m-dimensional geometric discriminant vector with said m-dimensional geometric discriminant vector from an m×m identity matrix; and
 (b) generating an orthogonal m-dimensional feature vectors by applying a linear transformation of said m-dimensional feature vectors using said m×m transform matrix.

33. The method of claim 5, wherein said step of generating an m-dimensional start vector uses a Fisher linear discriminant vector as said start vector.

34. The method of claim 5, wherein said step of generating an m-dimensional start vector generates said start vector randomly.

35. The method of claim 5, wherein said step of generating an m-dimensional start vector uses a heteroscedastic linear discriminant analysis vector as said start vector.

36. The method of claim 5, wherein said step of generating an m-dimensional start vector uses an average symmetric divergence linear analysis vector as said start vector.

37. The method of claim 5, wherein said step of generating an m-dimensional start vector uses a Bhattacharyya linear analysis vector as said start vector.

38. The method of claim 5, wherein said step of calculating statistics for said m-dimensional feature vectors further comprises the steps of:
 (a) creating a convex set for each of said classes;
 (b) creating a hyperellipsoid for each of said classes for said convex sets; and
 (c) calculating the mean and covariance for each of said classes;
and when said classes are modeled by normal probability density functions, said step of establishing a set of class contour levels further comprises the steps of:

(a) for each of said classes, choosing a scale factor;

(b) for each of said classes, creating a class contour level using said scale factor; and (c) for each of said classes, calculating a projected upper bound and a projected lower bound of said class contour level, using said mean and said covariance for each of said classes and said scale factor.

39. The method of claim 38, wherein said step of choosing a scale factor further comprises the step of choosing a real-valued number greater than 0 for said scale factor.

40. The method of claim 38, wherein said step of choosing a scale factor further comprises the steps of choosing a real-valued number for said scale factor such that contours of constant conditional density are the same for all of said classes.

41. The method of claim 38, wherein said step of choosing a scale factor further comprises the steps of choosing a real-valued number for said scale factor such that projected contours of constant conditional density are the same for all of said classes.

42. The method of claim 5, wherein said step of calculating statistics for said m-dimensional feature vectors further comprises the steps of:

(a) creating a convex set for each of said classes; and (b) creating a convex hull for each of said classes for said convex sets;

and said step of establishing a set of class contour levels further comprises the step of for each of said classes, calculating a projected upper bound and a projected lower bound of said class contour level, using said convex hull.

* * * * *